(12) United States Patent
Xu et al.

(10) Patent No.: US 11,576,161 B2
(45) Date of Patent: Feb. 7, 2023

(54) UPLINK RESOURCE SHARING FOR SIDELINK DEVICES

(71) Applicant: QUALCOMM Incorporated, San Diego, CA (US)

(72) Inventors: Huilin Xu, San Diego, CA (US); Duo Zhang, San Diego, CA (US); Fei Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/150,876

(22) Filed: Jan. 15, 2021

(65) Prior Publication Data

US 2022/0232554 A1 Jul. 21, 2022

(51) Int. Cl.
*H04W 72/04* (2009.01)
*H04W 76/27* (2018.01)

(52) U.S. Cl.
CPC ....... *H04W 72/0413* (2013.01); *H04W 76/27* (2018.02)

(58) Field of Classification Search
CPC ............. H04W 72/0413; H04W 76/27; H04W 72/1289; H04W 72/121; H04L 5/0091; H04L 5/001; H04L 5/0033; H04L 5/0053; H04L 5/008; Y02D 30/70
See application file for complete search history.

(56) References Cited

U.S. PATENT DOCUMENTS

| 2015/0085805 A1* | 3/2015 | Li | H04W 72/121 |
| | | | 370/329 |
| 2019/0335480 A1* | 10/2019 | Sun | H04W 72/14 |
| 2020/0351889 A1* | 11/2020 | Bai | H04W 72/14 |

FOREIGN PATENT DOCUMENTS

EP 3952521 A1 * 2/2022 ........ H04W 72/0413

OTHER PUBLICATIONS

International Search Report and Written Opinion—PCT/US2021/065134—ISA/EPO—dated Apr. 21, 2022.
(Continued)

*Primary Examiner* — Farid Seyedvosoghi
(74) *Attorney, Agent, or Firm* — Holland & Hart / Qualcomm

(57) ABSTRACT

Methods, systems, and devices for wireless communication are described to support allocation of a group-based configured uplink resource for idle mode uplink transmissions. User equipments (UEs) may be grouped geographically and/or functionally and may have sidelink communications among themselves, and may be in an inactive mode or an idle mode. A base station may allocation one or multiple configured uplink resources to the group of UEs, where the base station may be aware of the group based on signaling from a UE of the group. The group of UEs may determine which UE of the group may use the allocated resources, and in which occasions. Based on the determination, one or more UEs of the group may transmit an uplink message to the base station using the configured uplink resource assigned to the group.

60 Claims, 19 Drawing Sheets

(56) References Cited

OTHER PUBLICATIONS

Nokia., et al., "Signaling Aspects for Transmission in Preconfigured Resources", 3GPP Draft, 3GPP TSG RAN WG2 Meeting #104, R2-1817043-Preconfigured-Uplink-Transmission-v2, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018 (Nov. 12, 2018), 4 Pages, XP051556592, Retrieved from the Internet: URL: http://www.3gpp.org/ftp/Meetings%5F3GPP%5FSYNC/RAN2/Docs/R2%2D1817043%2Ezip [retrieved on Nov. 12, 2018] Section 3, Observation 3, Proposal 4 and Proposal 7.
Qualcomm Incorporated: "Autonomous UL Transmission in NR Unlicensed", 3GPP Draft, 3GPP TSG RAN WG1 Meeting #92bis, R1-1804832, 7.6.5 NR-U AUL, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427098, 7 Pages, Retrieved from the Internet: URL:http://www.3gpp.org/ftp/Meetings%5F3GPP%5FSYNC/RAN1/Docs/ [retrieved on Apr. 15, 2018], p. 4, paragraph 3.1, p. 5, paragraph 3.2 Section 3.4.

* cited by examiner

UPLINK RESOURCE SHARING FOR SIDELINK DEVICES

FIELD OF TECHNOLOGY

The following relates to wireless communication, including uplink resource sharing for sidelink devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some UEs may enter an idle mode to save power, where entering the idle mode may include ending a connection with the base station. In some cases, however, a UE may occasionally generate and transmit uplink data to the base station while in the idle mode.

SUMMARY

The described techniques relate to improved methods, systems, devices, and apparatuses that support uplink resource sharing for sidelink devices. Generally, the described techniques provide for allocating a group-based configured uplink resource for idle mode uplink transmissions. User equipments (UEs) may be grouped geographically and/or functionally and may have sidelink communications among themselves. In some scenarios, a group of UEs may enter an idle mode in which UEs of the group may occasionally transmit uplink data to a base station. One or multiple configured uplink resources may be allocated to the group of clustered UEs (e.g., by a base station) for idle mode uplink transmissions. The base station may be aware of the group (e.g., based on signaling from a UE of the group) and may allocate the one or multiple configured uplink resources to the group. The group of UEs may determine which UE (e.g., of the group) may use the allocated resources, and in which occasions. Based on the determination, one or more UEs of the group may transmit an uplink message to the base station using the configured uplink resource assigned to the group.

A method for wireless communication at a first UE is described. The method may include transmitting, to a base station, an indication of a UE group including a set of multiple sidelink UEs, receiving a group resource allocation message indicating an uplink group resource occasion allocated to at least one sidelink UE of the set of multiple sidelink UEs for idle mode uplink transmission, and transmitting, in idle mode, an uplink message to the base station during the uplink group resource occasion based on receiving the group resource allocation message.

An apparatus for wireless communication at a first UE is described. The apparatus may include a processor, memory in electronic communication with the processor, and instructions stored in the memory. The instructions may be executable by the processor to cause the apparatus to transmit, to a base station, an indication of a UE group including a set of multiple sidelink UEs, receive a group resource allocation message indicating an uplink group resource occasion allocated to at least one sidelink UE of the set of multiple sidelink UEs for idle mode uplink transmission, and transmit, in idle mode, an uplink message to the base station during the uplink group resource occasion based on receiving the group resource allocation message.

Another apparatus for wireless communication at a first UE is described. The apparatus may include means for transmitting, to a base station, an indication of a UE group including a set of multiple sidelink UEs, means for receiving a group resource allocation message indicating an uplink group resource occasion allocated to at least one sidelink UE of the set of multiple sidelink UEs for idle mode uplink transmission, and means for transmitting, in idle mode, an uplink message to the base station during the uplink group resource occasion based on receiving the group resource allocation message.

A non-transitory computer-readable medium storing code for wireless communication at a first UE is described. The code may include instructions executable by a processor to transmit, to a base station, an indication of a UE group including a set of multiple sidelink UEs, receive a group resource allocation message indicating an uplink group resource occasion allocated to at least one sidelink UE of the set of multiple sidelink UEs for idle mode uplink transmission, and transmit, in idle mode, an uplink message to the base station during the uplink group resource occasion based on receiving the group resource allocation message.

In some examples of the method, apparatuses, and non-transitory computer-readable medium described herein, transmitting the indication of the UE group may include operations, features, means, or instructions for transmitting a request for a group resource for idle mode uplink transmissions for the UE group, where receiving the group resource allocation message may be based on transmitting the request.

In some examples of the method, apparatuses, and non-transitory computer-readable medium described herein, receiving the group resource allocation message may include operations, features, means, or instructions for receiving the group resource allocation message from the base station indicating the uplink group resource occasion may be allocated to a first subset of the set of multiple sidelink UEs, where the first subset includes the first UE.

Some examples of the method, apparatuses, and non-transitory computer-readable medium described herein may further include operations, features, means, or instructions for transmitting an indication of the uplink group resource occasion to one or more second UEs of a second subset of the set of multiple sidelink UEs based on receiving the group resource allocation message.

In some examples of the method, apparatuses, and non-transitory computer-readable medium described herein, receiving the group resource allocation message may include operations, features, means, or instructions for receiving the group resource allocation message from the base station indicating the uplink group resource occasion may be allocated to the set of multiple sidelink UEs of the UE group.

In some examples of the method, apparatuses, and non-transitory computer-readable medium described herein, the group resource allocation message includes a group identifier (ID) associated with the UE group.

In some examples of the method, apparatuses, and non-transitory computer-readable medium described herein, receiving the group resource allocation message may include operations, features, means, or instructions for receiving a radio resource control (RRC) release message including the group resource allocation message.

In some examples of the method, apparatuses, and non-transitory computer-readable medium described herein, receiving the group resource allocation message may include operations, features, means, or instructions for receiving, operating in a connected mode, an RRC message including the group resource allocation message.

Some examples of the method, apparatuses, and non-transitory computer-readable medium described herein may further include operations, features, means, or instructions for receiving, from a second UE of the set of multiple sidelink UEs, a sidelink message indicating uplink data to transmit to the base station via the uplink message during the uplink group resource occasion, where transmitting the uplink message to the base station may be based on receiving the sidelink message.

In some examples of the method, apparatuses, and non-transitory computer-readable medium described herein, transmitting the uplink message may include operations, features, means, or instructions for transmitting the uplink message including uplink data at least partially overlapping with a transmission of the uplink data during the uplink group resource occasion by a second UE of the set of multiple sidelink UEs.

In some examples of the method, apparatuses, and non-transitory computer-readable medium described herein, transmitting the uplink message may include operations, features, means, or instructions for transmitting the uplink message including uplink data and an ID of the first UE or a second UE, where the ID indicates that the uplink data may be generated by the first UE or the second UE.

Some examples of the method, apparatuses, and non-transitory computer-readable medium described herein may further include operations, features, means, or instructions for receiving, from a second UE of the set of multiple sidelink UEs, an allocation message allocating the uplink group resource occasion to the first UE, where transmitting the uplink message in the uplink group resource occasion may be based on receiving the allocation message.

Some examples of the method, apparatuses, and non-transitory computer-readable medium described herein may further include operations, features, means, or instructions for transmitting, to the second UE, an allocation request message requesting the uplink group resource occasion for transmission of the uplink message, where receiving the allocation message from the second UE may be based on transmitting the allocation request message.

Some examples of the method, apparatuses, and non-transitory computer-readable medium described herein may further include operations, features, means, or instructions for transmitting, to multiple UEs of the set of multiple sidelink UEs, a sidelink control message reserving the uplink group resource occasion for transmission of the uplink message based on detecting that the uplink group resource occasion may be unreserved, where transmitting the uplink message in the uplink group resource occasion may be based on transmitting the sidelink control message.

In some examples of the method, apparatuses, and non-transitory computer-readable medium described herein, transmitting the uplink message may include operations, features, means, or instructions for transmitting the uplink message based on a number of continuous uplink transmissions by the first UE satisfying a threshold.

Some examples of the method, apparatuses, and non-transitory computer-readable medium described herein may further include operations, features, means, or instructions for receiving, from a controller UE of the set of multiple sidelink UEs, an allocation message allocating the uplink group resource occasion and a second uplink group resource occasion to the first UE, where transmitting the uplink message in the uplink group resource occasion may be based on receiving the allocation message and transmitting a second uplink message to the base station during the second uplink group resource occasion based on receiving the allocation message.

Some examples of the method, apparatuses, and non-transitory computer-readable medium described herein may further include operations, features, means, or instructions for transmitting, to multiple UEs of the set of multiple sidelink UEs, a sidelink control message reserving the uplink group resource occasion and a second uplink group resource occasion, where transmitting the uplink message in the uplink group resource occasion may be based on transmitting the sidelink control message and transmitting a second uplink message to the base station during the second uplink group resource occasion based on transmitting the sidelink control message.

In some examples of the method, apparatuses, and non-transitory computer-readable medium described herein, transmitting the uplink message may include operations, features, means, or instructions for transmitting, during the uplink group resource occasion, the uplink message to one or more second UEs of the set of multiple sidelink UEs for relaying the uplink message to the base station during a second uplink group resource occasion.

In some examples of the method, apparatuses, and non-transitory computer-readable medium described herein, transmitting the uplink message may include operations, features, means, or instructions for receiving, from a second UE of the set of multiple sidelink UEs prior to the uplink group resource occasion, a sidelink message indicating uplink data to transmit to the base station during the uplink group resource occasion and transmitting the uplink message including the uplink data at least partially overlapping with a transmission of the uplink data during the uplink group resource occasion by the second UE based on receiving the sidelink message.

In some examples of the method, apparatuses, and non-transitory computer-readable medium described herein, receiving the group resource allocation message may include operations, features, means, or instructions for receiving the group resource allocation message indicating an uplink group resource response occasion corresponding to the uplink group resource occasion.

Some examples of the method, apparatuses, and non-transitory computer-readable medium described herein may further include operations, features, means, or instructions for receiving, from the base station, a response to the uplink message in the uplink group resource response occasion corresponding to the uplink group resource occasion.

In some examples of the method, apparatuses, and non-transitory computer-readable medium described herein, receiving the response to the uplink message may include operations, features, means, or instructions for receiving the response to the uplink message in the uplink group resource response occasion at least partially overlapping with reception of the response to the uplink message during the uplink group resource response occasion at a second UE of the set of multiple sidelink UEs.

In some examples of the method, apparatuses, and non-transitory computer-readable medium described herein, receiving the response to the uplink message may include operations, features, means, or instructions for receiving the response to the uplink message indicating a timing advance or an update to the uplink group resource occasion and transmitting an indication of the timing advance or the update to the uplink group resource occasion to one or more second UEs of the set of multiple sidelink UEs based on receiving the response to the uplink message.

Some examples of the method, apparatuses, and non-transitory computer-readable medium described herein may further include operations, features, means, or instructions for receiving, from a second UE of the set of multiple sidelink UEs, a response to the uplink message relayed from the base station based on transmitting the uplink message.

A method for wireless communication at a base station is described. The method may include receiving an indication of a UE group that includes a set of multiple sidelink UEs, transmitting a group resource allocation message indicating an uplink group resource occasion allocated to at least one sidelink UE of the set of multiple sidelink UEs for idle mode uplink transmission, and receiving an uplink message from a first UE of the set of multiple sidelink UEs during the uplink group resource occasion.

An apparatus for wireless communication at a base station is described. The apparatus may include a processor, memory in electronic communication with the processor, and instructions stored in the memory. The instructions may be executable by the processor to cause the apparatus to receive an indication of a UE group that includes a set of multiple sidelink UEs, transmit a group resource allocation message indicating an uplink group resource occasion allocated to at least one sidelink UE of the set of multiple sidelink UEs for idle mode uplink transmission, and receive an uplink message from a first UE of the set of multiple sidelink UEs during the uplink group resource occasion.

Another apparatus for wireless communication at a base station is described. The apparatus may include means for receiving an indication of a UE group that includes a set of multiple sidelink UEs, means for transmitting a group resource allocation message indicating an uplink group resource occasion allocated to at least one sidelink UE of the set of multiple sidelink UEs for idle mode uplink transmission, and means for receiving an uplink message from a first UE of the set of multiple sidelink UEs during the uplink group resource occasion.

A non-transitory computer-readable medium storing code for wireless communication at a base station is described. The code may include instructions executable by a processor to receive an indication of a UE group that includes a set of multiple sidelink UEs, transmit a group resource allocation message indicating an uplink group resource occasion allocated to at least one sidelink UE of the set of multiple sidelink UEs for idle mode uplink transmission, and receive an uplink message from a first UE of the set of multiple sidelink UEs during the uplink group resource occasion.

In some examples of the method, apparatuses, and non-transitory computer-readable medium described herein, receiving the indication of the UE group may include operations, features, means, or instructions for receiving a request for a group resource for idle mode uplink transmissions for the UE group, where transmitting the group resource allocation message may be based on receiving the request.

In some examples of the method, apparatuses, and non-transitory computer-readable medium described herein, transmitting the group resource allocation message may include operations, features, means, or instructions for transmitting the group resource allocation message indicating the uplink group resource occasion may be allocated to a first subset of the set of multiple sidelink UEs, where the first subset includes the first UE.

In some examples of the method, apparatuses, and non-transitory computer-readable medium described herein, transmitting the group resource allocation message may include operations, features, means, or instructions for transmitting the group resource allocation message indicating the uplink group resource occasion may be allocated to the set of multiple sidelink UEs of the UE group.

In some examples of the method, apparatuses, and non-transitory computer-readable medium described herein, the group resource allocation message includes a group ID associated with the UE group.

In some examples of the method, apparatuses, and non-transitory computer-readable medium described herein, transmitting the group resource allocation message may include operations, features, means, or instructions for transmitting an RRC release message including the group resource allocation message.

In some examples of the method, apparatuses, and non-transitory computer-readable medium described herein, transmitting the group resource allocation message may include operations, features, means, or instructions for transmitting an RRC message including the group resource allocation message to the at least one sidelink UE operating in a connected mode.

In some examples of the method, apparatuses, and non-transitory computer-readable medium described herein, receiving the uplink message may include operations, features, means, or instructions for receiving the uplink message from the first UE including uplink data and receiving, from a second UE of the set of multiple sidelink UEs, a second uplink message including the uplink data during the uplink group resource occasion.

In some examples of the method, apparatuses, and non-transitory computer-readable medium described herein, receiving the uplink message may include operations, features, means, or instructions for receiving the uplink message including uplink data and an ID of the first UE or a second UE, where the ID indicates that the uplink data may be generated by the first UE or the second UE.

In some examples of the method, apparatuses, and non-transitory computer-readable medium described herein, transmitting the group resource allocation message may include operations, features, means, or instructions for transmitting the group resource allocation message indicating a threshold number of continuous uplink transmissions.

In some examples of the method, apparatuses, and non-transitory computer-readable medium described herein, receiving the uplink message may include operations, features, means, or instructions for receiving the uplink message from the first UE including uplink data and receiving, during a second uplink group resource occasion after the uplink group resource occasion, a second uplink message including the uplink data from a second UE of the set of multiple sidelink UEs.

In some examples of the method, apparatuses, and non-transitory computer-readable medium described herein, transmitting the group resource allocation message may include operations, features, means, or instructions for transmitting the group resource allocation message indicating an uplink group resource response occasion corresponding to the uplink group resource occasion.

Some examples of the method, apparatuses, and non-transitory computer-readable medium described herein may further include operations, features, means, or instructions for transmitting, to the first UE, a response to the uplink message during the uplink group resource response occasion corresponding to the uplink group resource occasion.

In some examples of the method, apparatuses, and non-transitory computer-readable medium described herein, transmitting the response to the uplink message may include operations, features, means, or instructions for transmitting, to a second UE of the set of multiple sidelink UEs, the response to the uplink message during the uplink group resource response occasion.

Some examples of the method, apparatuses, and non-transitory computer-readable medium described herein may further include operations, features, means, or instructions for transmitting a response to the uplink message indicating a timing advance or an update to the uplink group resource occasion during the uplink group resource response occasion corresponding to the uplink group resource occasion.

Some examples of the method, apparatuses, and non-transitory computer-readable medium described herein may further include operations, features, means, or instructions for transmitting, to a second UE of the set of multiple sidelink UEs, a response to the uplink message during the uplink group resource response occasion corresponding to the uplink group resource occasion

DETAILED DESCRIPTION

Figure 1:
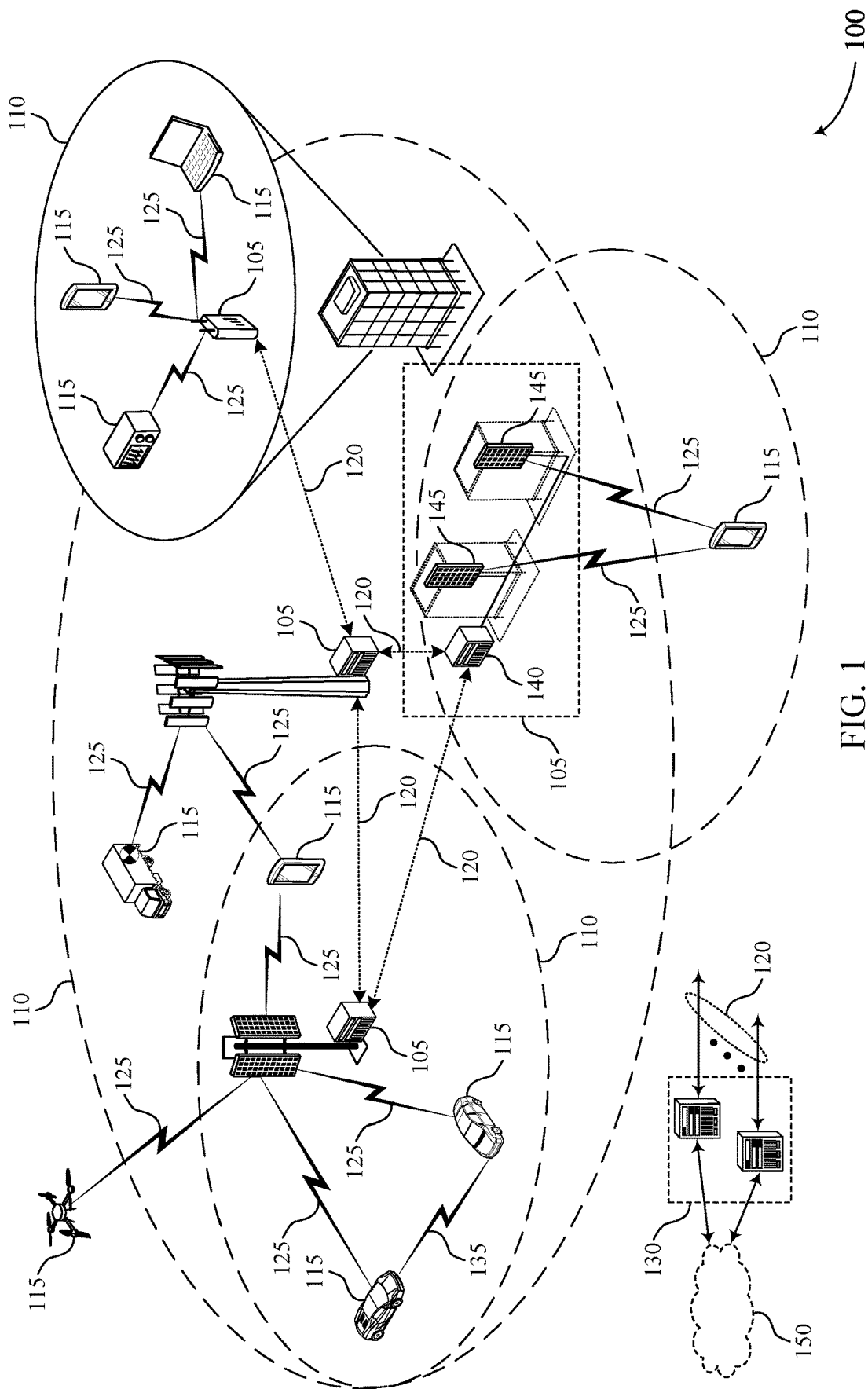
FIG. 1 illustrates an example of a wireless communications system in accordance with aspects of the present disclosure.

An idle mode user equipment (UE) may be configured with an uplink resource (e.g., a preconfigured uplink resource) for the UE to transmit uplink data to a base station without a radio resource control (RRC) connection to the network (e.g., without re-establishing a connection with the base station). When using a configured uplink resource for idle mode uplink transmissions, overhead for connection establishment and/or uplink synchronization may be avoided. The configured uplink resource may repeat in time (e.g., may include multiple transmission occasions).

The configured uplink resource may be configured per UE, such that in a network with N idle mode UEs, N resources may be configured separately for the idle mode UEs. In some cases, in an idle mode, a UE may generate uplink data less frequently than a repetition of the configured uplink resource and may therefore leave some configured uplink resource occasions unused (e.g., during time periods or occasions in which the UE may not generate uplink data for transmission to a base station). The unused resources may contribute to increased resource overhead and decreased resource use. In some cases, the UE may additionally or alternatively generate more uplink data than what may be transmitted via one configured uplink resource occasion. In such cases, the UE may transmit some of the uplink data in a first configured uplink resource occasion and some in a second configured uplink resource occasion (e.g., in a time period after the first configured uplink resource occasion), which may increase transmission latency (e.g., a latency between the first and second configured uplink resource occasions).

The present disclosure provides techniques for increasing resource use, decreasing resource overhead, and reducing communication latency, for example, based on a group-based configured uplink resource. A group of UEs may be geographically and/or functionally clustered and may have sidelink communications among themselves. The group of UEs may enter an idle mode in which UEs of the group may occasionally transmit uplink data to a base station (e.g., may have limited communications with the network, based on being in an inactive mode or an idle mode). As such, the UEs of the group may use a configured uplink resource for uplink data transmission. One or multiple configured uplink resources may be allocated to the group of clustered UEs (e.g., by a base station). The base station may be aware of the group (e.g., based on signaling from a UE of the group) and may allocate the one or multiple configured uplink resources to the group. The group of UEs may determine which UE (e.g., of the group) may use the allocated resources, and in which occasions.

One or more UEs of the group may transmit an uplink message to the base station using a configured uplink resource assigned to the group (e.g., based on the group determining when and which UEs may use the configured uplink resource). The base station may transmit a response to the uplink message to one or more of the UEs of the group in response to receiving the uplink message via the configured uplink resource. Allocating the configured uplink resource on a group basis may increase flexibility for allocating the configured uplink resource to the UEs 115 of the group, which may increase resource use and decrease overhead. In some cases, the group configured uplink resource may include more resources than a configured uplink resource for a single UE 115, which may reduce communication latency (e.g., by supporting transmission of uplink data in a single, larger configured uplink resource).

Aspects of the disclosure are initially described in the context of wireless communications systems. Aspects of the disclosure are further illustrated by and described with reference to process flows, apparatus diagrams, system diagrams, and flowcharts that relate to uplink resource sharing for sidelink devices.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A group of UEs 115 may be geographically and/or functionally clustered and may have sidelink communications among themselves. The group of UEs 115 may enter an idle mode where UEs 115 of the group may occasionally transmit uplink data to a base station 105 (e.g., may have limited communications with the network, based on entering an inactive mode or an idle mode). A base station 105 may allocate one or multiple configured uplink resources to the group of clustered UEs 115. The base station 105 may be aware of the group based on signaling from a UE 115 of the group. The group of UEs 115 may determine which UE 115 (e.g., of the group) may use the allocated resources, and in which occasions. One or more UEs 115 of the group may transmit an uplink message to the base station 105 using a configured uplink resource assigned to the group (e.g., based on the group determining when and which UEs may use the configured uplink resource).

Figure 2:
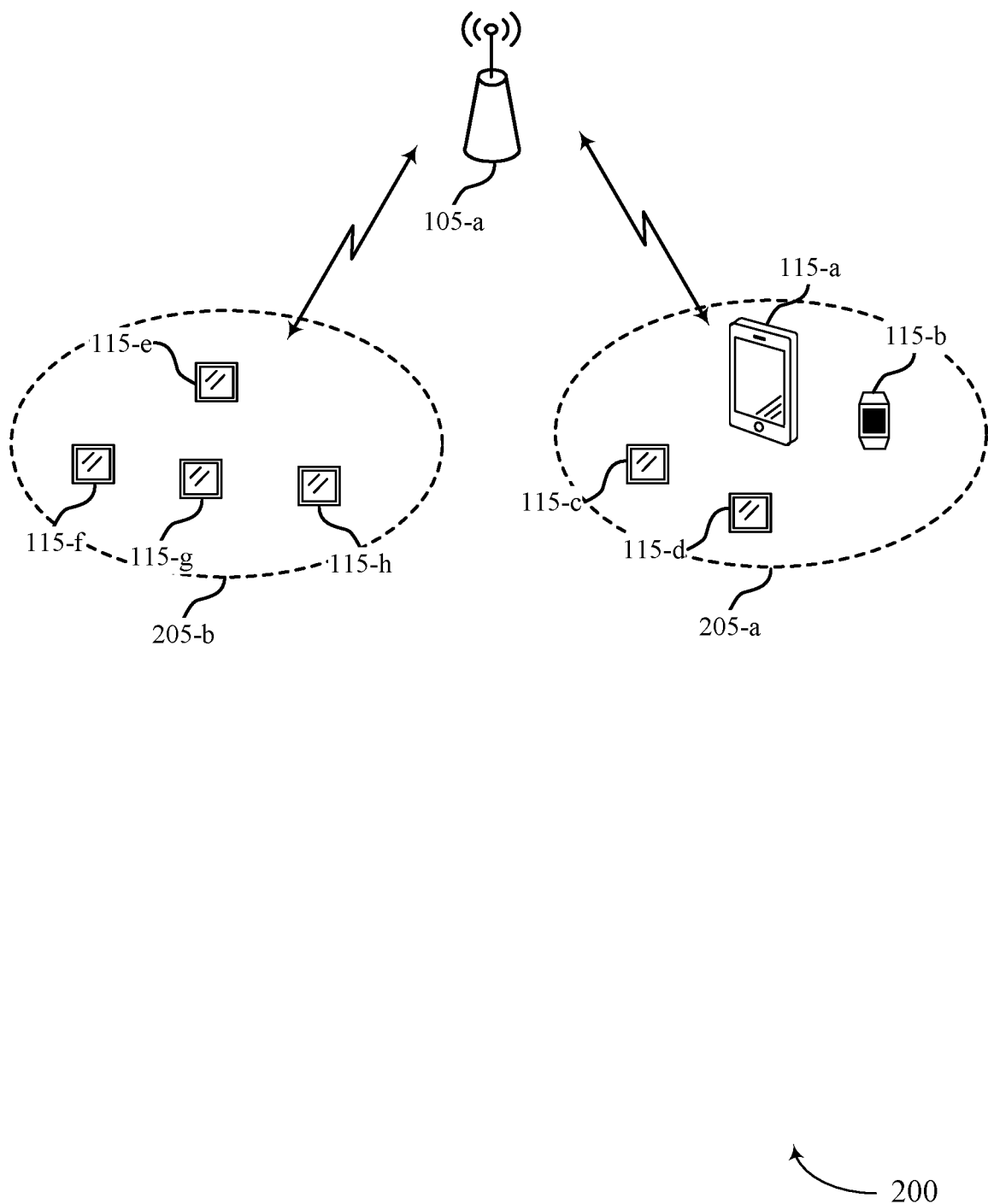
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement some aspects of wireless communications system 100. For example, wireless communications system 200 may include a base station 105-a and UEs 115-a, 115-b, 115-c, 115-d, 115-e, 115-f, 115-g, and 115-h, which may represent respective examples of a base station 105 and UEs 115 described with reference to FIG. 1. In some cases, UEs 115-a, 115-b, 115-c, 115-d, 115-e, 115-f, 115-g, and 115-h may represent UEs 115 operating in an idle mode with base station 105-a.

An idle mode UE 115, for example, may previously operate in a connected mode with base station 105-a and may receive a message (e.g., an RRCRelease message) switching the UE 115 to an idle or an inactive mode. For an idle mode UE 115 to re-enter a connected mode, the UE 115 may re-establish a connection with base station 105-a, for example, via a random access procedure. An idle mode UE (e.g., any of the idle mode UEs 115) may be configured with an uplink resource (e.g., a preconfigured uplink resource) for the UE 115 to transmit uplink data to base station 105-a without a connection to the network (e.g., without re-establishing a connection with base station 105-a). The UE 115 may, for example, use the configured uplink resource to report sensing data (e.g., small size sensing data) to the network (e.g., may report the sensing data sporadically to the network).

When using a configured uplink resource for idle or inactive mode uplink transmissions, overhead for connection establishment and/or uplink synchronization may be avoided. For example, the configured uplink resource may be applicable to stationary or low mobility UEs 115 and may maintain validity if timing alignment validation rules are satisfied, thus avoiding the overhead for connection establishment and/or uplink synchronization. For example, if an idle mode UE 115 has a low amount of movement, uplink timing may roughly be synchronized. Configuration parameters for the configured uplink resource may be provided by the network, such as via an RRCRelease message to an idle or inactive mode UE 115. The configured uplink resource may repeat in time (e.g., may include multiple transmission occasions) for the UE 115 to transmit uplink data over time (e.g., periodically).

Base station 105-a may transmit a response to an uplink transmission from an idle or inactive mode UE 115 received on the configured uplink resource. The response may include an indication of whether the uplink transmission is successfully decoded, a timing advance command to adjust the uplink timing for the UE 115 (e.g., to synchronize with the base station 105-a), an adjustment of the configured uplink resource configuration (e.g., an indication to use a modulation coding scheme (MCS) or transmit power for subsequent uplink transmission), an indication for the UE 115 to stop using the configured uplink resource, or any combination thereof.

The configured uplink resource may be configured per UE 115, such that in a network with N idle mode UEs 115, N resources may be configured separately for each UE of the UEs 115. In some cases, in the idle mode, a UE 115 may generate uplink data for transmission to base station 105-a less frequently than a repetition of the configured uplink resource and may therefore leave some configured uplink resource occasions unused (e.g., during time periods or occasions in which the UE 115 may not generate uplink data for transmission to base station 105-a). The unused resources may contribute to increased resource overhead and decreased resource use. In some cases, the UE 115 may additionally or alternatively generate more uplink data (e.g., during a time period) than is able to be transmitted via one configured uplink resource occasion. In such cases, the UE 115 may transmit some of the uplink data in a first configured uplink resource occasion and some in a second configured uplink resource occasion (e.g., in a time period after the first configured uplink resource), which may increase transmission latency (e.g., a latency between the first and second configured uplink resource occasions).

The present disclosure provides techniques for increasing resource use, decreasing resource overhead, and reducing communication latency, for example, based on a group-based configured uplink resource configuration. A group 205 of UEs 115 may be geographically and/or functionally clustered and may have sidelink communications among themselves. In some cases, a UE 115 may be included in multiple groups 205. The group 205 of UEs 115 may operate in an idle mode that may limit communications with the network (e.g., over an interface between the UEs 115 and base station 105-a, such as UMTS terrestrial radio access network (UTRAN)-to-UE (Uu) interface), and may be in an inactive mode or an idle mode most of the time. As such, the UEs 115 of the group 205 may use a configured uplink resource for uplink data transmission.

One or multiple configured uplink resources may be allocated to the group 205 of clustered UEs 115 (e.g., by base station 105-a). In some cases, the amount of resources allocated to the group may be larger than an amount of resources allocated to a single UE 115. Base station 105-a may be aware of the group 205 (e.g., based on signaling from a UE 115 of the group), and may, for example, be aware of a group ID of the group 205 and at least one UE 115 of the group. The group 205 may determine when and which UE 115 (e.g., of the group 205) may use the allocated resources.

In one example, UE 115-a (e.g., an enhance mobile broadband (eMBB) UE 115, such as a cell phone) and some wearable devices (e.g., reduce capability UEs 115-b, 115-c and 115-d) carried by a same person may form a cluster or group 205-a. The wearable devices may be clustered with UE 115-a and may use UE 115-a as centralized control (e.g., based on the wearable devices being lower tier or reduced capability tier UEs 115). In another example, a group of wireless sensors (e.g., UEs 115-e, 115-f, 115-g, and 115-h) may form a cluster or group 205-b. The wireless sensors may be clustered with sidelink communications among themselves.

One or more UEs 115 of group 205-a or 205-b may transmit an uplink message to base station 105-a using a configured uplink resource assigned to the respective group 205 (e.g., based on the group 205 determining when and which UEs 115 may use the configured uplink resource).

Base station 105-*a* may transmit a response to the uplink message to one or more of the UEs 115 of the respective group 205 in response to receiving the uplink message via the configured uplink resource.

Figure 3:
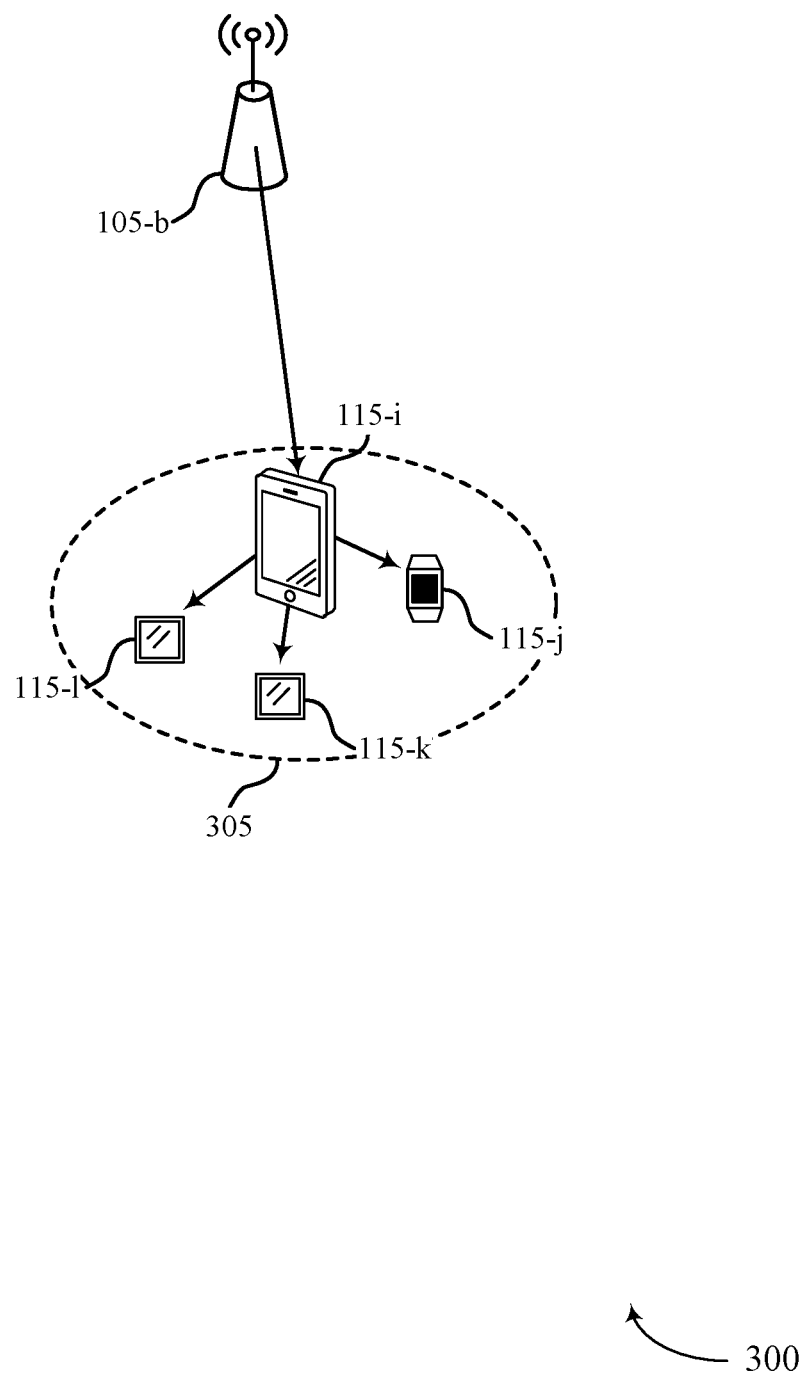
FIG. 3 illustrates an example of a wireless communications system in accordance with aspects of the present disclosure.

FIG. 3 illustrates an example of a wireless communications system 300 in accordance with aspects of the present disclosure. In some examples, wireless communications system 300 may implement some aspects of wireless communications system 100 or 200. For example, wireless communications system 300 may include a base station 105-*b* and UEs 115-*i*, 115-*j*, 115-*k*, and 115-*l*, which may represent respective examples of a base station 105 and UEs 115 described with reference to FIGS. 1 and 2. As described with reference to FIG. 2, UEs 115-*i*, 115-*j*, 115-*k*, and 115-*l* may form a group 305 of sidelink UEs 115, where the group 305 may be assigned a group configured uplink resource for idle mode uplink transmissions to base station 105-*b*.

A configured uplink resource (e.g., a preconfigured uplink resource) may be configured for a group 305 of clustered UEs 115. In a first example, a same configured uplink resource may be configured to one UE 115 or a subset of UEs 115 in the group 305. The configured uplink resource configuration may be propagated by the UE 115 or the subset of UEs 115 to other UEs 115 in the group 305. For example, UE 115-*i* (e.g., among other UEs 115 of the group 305) may receive the configured uplink resource configuration (e.g., from base station 105-*b*) and may share the configuration to other UEs 115 in the group 305, such as UEs 115-*j*, 115-*k* and 115-*l* (e.g., among other UEs 115).

In a second example, a same configured uplink resource may be configured to all UEs 115 of the group 305 (e.g., base station 105-*b* may transmit the configuration to each UE 115 of the group 305). In such cases, the network may indicate, within the configured uplink resource configuration, that the resource is a group-based resource by including a group ID of the group 305 (e.g., within a field of a message).

The allocation of configured uplink resource(s) per UE cluster (e.g., a UE group-based resource allocation) may simplify configured uplink resource management at base station 105-*b*. Because the UEs 115 in the group 305 may be geographically and/or logically clustered, the UEs 115 may more dynamically adjust to the usage of the configured uplink resource(s) by each UE 115. Additionally, the group-based resource allocation may avoid fragmentation of resources (e.g., which may occur due to resource allocation on a per-UE basis if a number of UEs 115 is large). In some cases, a total number of resources for the group 305 of UEs 115 may be reduced (e.g., which may reduce total overhead), while an instantaneous amount or quantity of resources (e.g., maximum amount of resources) that may be used per UE 115 may be increased.

Figure 4:
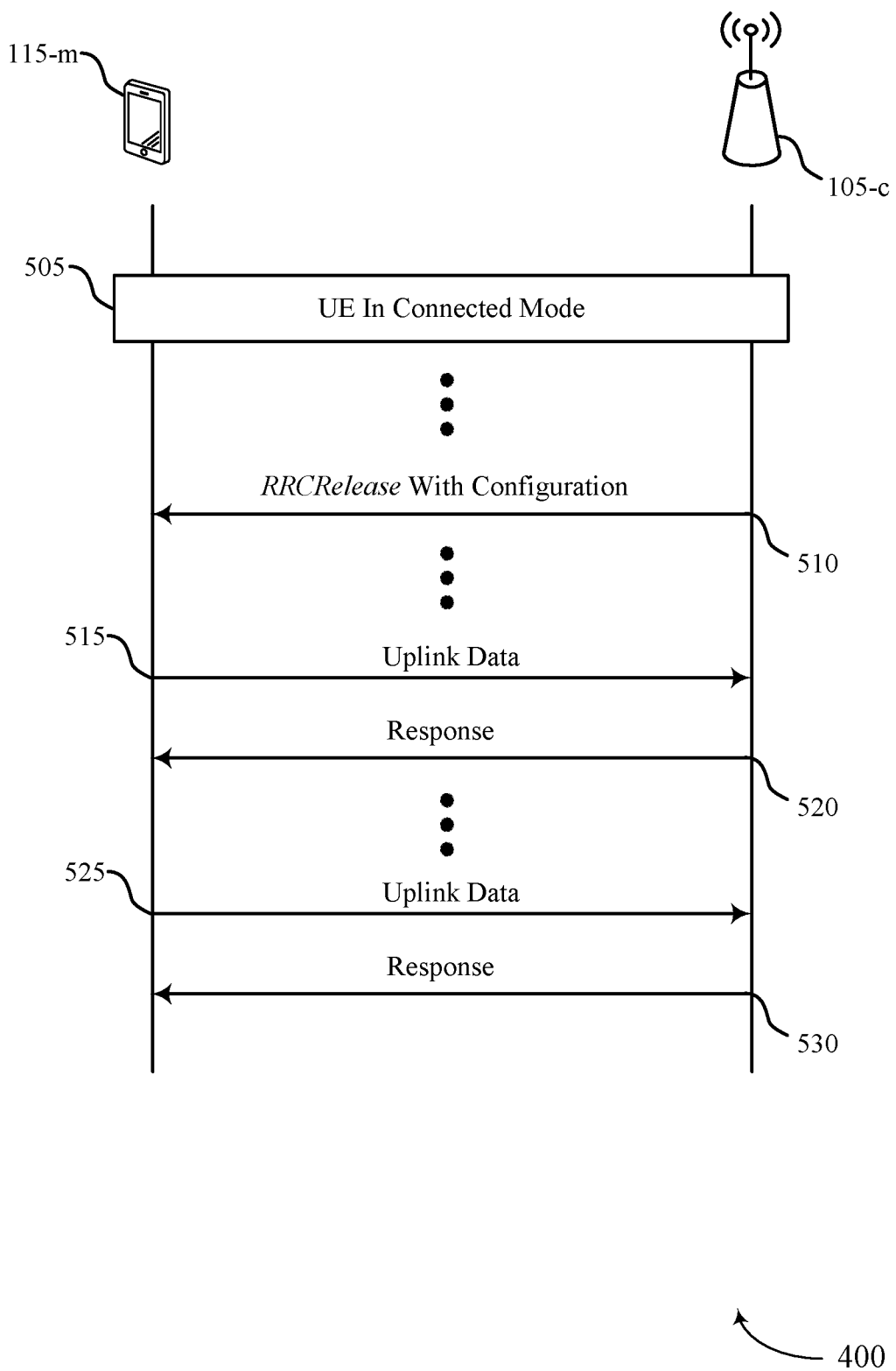
FIG. 4 illustrates an example of a process flow in accordance with aspects of the present disclosure.

FIG. 4 illustrates an example of a process flow 400 in accordance with aspects of the present disclosure. In some examples, process flow 400 may implement or be implemented by some aspects of wireless communications system 100 or 200. In some examples, process flow 400 may implement or be implemented by some aspects of wireless communications system 300. Process flow 400 may be implemented by a base station 105-*c* and a UE 115-*m*, which may represent respective examples of a base station 105 and a UE 115 described with reference to FIGS. 1-3. UE 115-*m* may represent a UE 115 in a group of sidelink UEs 115, where the group may be assigned a group configured uplink resource for idle mode uplink transmissions to base station 105-*c*.

In the following description of process flow 400, the operations may be performed in a different order than the order shown, or the operations performed by UE 115-*m* and base station 105-*c* may be performed in different orders or at different times. For example, specific operations may also be left out of process flow 400, or other operations may be added to process flow 400. Although UE 115-*m* and base station 105-*c* are shown performing the operations of process flow 400, some aspects of some operations may also be performed by one or more other wireless devices.

The network (e.g., base station 105-*c*) may signal UE 115-*m* (e.g., among other UEs 115 in the group) to configure the group-based configured uplink resource. In a first example, the network (e.g., base station 105-*c*) may configure the group configured uplink resource in an RRCRelease message to UE 115-*m* when UE 115-*m* exits a connected mode. For example, at 510, base station 105-*c* may transmit the group configured uplink resource configuration to UE 115-*m*, via an RRCRelease message (e.g., or other message associated with exiting connected mode). The RRCRelease message may follow a procedure (e.g., a defined or conventional procedure) to provide the configuration to UE 115-*m*.

In a second example, the network (e.g., base station 105-*c*) may configure the group configured uplink resource in a different RRC message (e.g., an RRC message other than a RRCRelease message) to a connected mode UE 115 in the group of UEs 115. For example, at 505, base station 105-*c* may transmit the group configured uplink resource configuration to UE 115-*m* when UE 115-*m* operates in connected mode. In such cases, the connected mode UE 115 (e.g., UE 115-*m*) may represent a controller UE 115 for the group.

In any of the examples described herein, the network may configure the group configured uplink resource to one UE 115 or multiple UEs 115 in the group (e.g., a subset or all of the UEs 115), as described with reference to FIG. 3.

In some cases, multiple configured uplink resources (e.g., multiple, repeating configured uplink resources) may be allocated to a group of UEs 115. When multiple configured uplink resources are allocated, a UE 115 (e.g., UE 115-*m*) within the group may be assigned (e.g., allocated) more than one configured uplink resource for communications with base station 105-*c* (e.g., based on an amount of data to be transmitted by the UE 115). A UE 115 (e.g., a reduced capability UE) may use the multiple resources to repeat transmission of an uplink message, for example, to make up gain loss due to a reduced number or size of antennas. For example, UE 115-*m* may repeat transmission of uplink data at 515 and at 525 (e.g., and base station may transmit a respective response to UE 115-*m* at 520 and 530).

Figure 5:
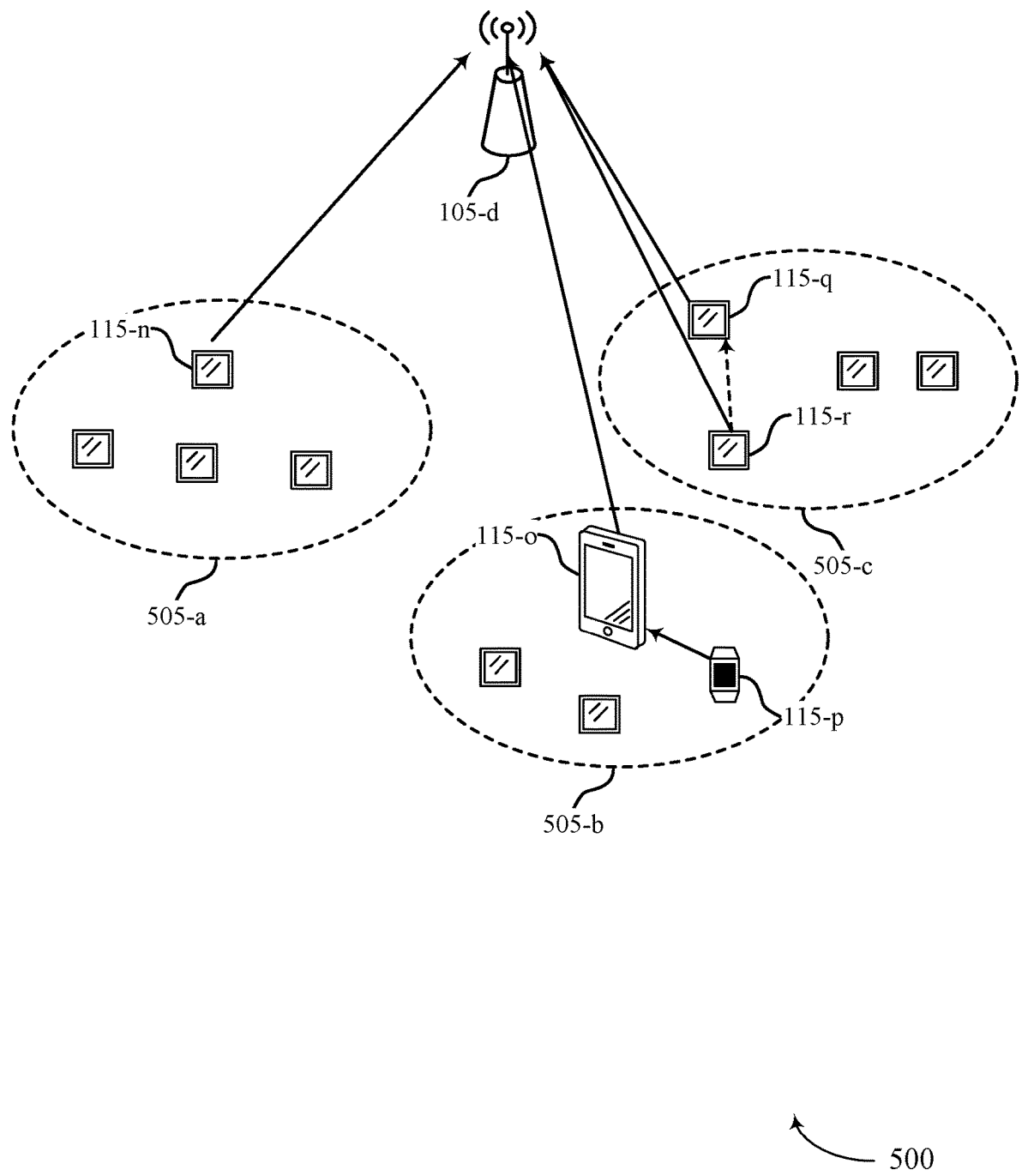
FIG. 5 illustrates an example of a wireless communications system in accordance with aspects of the present disclosure.

FIG. 5 illustrates an example of a wireless communications system 500 in accordance with aspects of the present disclosure. In some examples, wireless communications system 500 may implement some aspects of wireless communications system 100 or 200. In some examples, wireless communications system 500 may implement or be implemented by some aspects of wireless communications system 300 or process flow 400. Wireless communications system 500 may include a base station 105-*d* and UEs 115-*n*, 115-*o*, 115-*p*, 115-*q*, and 115-*r*, which may represent respective examples of a base station 105 and UEs 115 described with reference to FIGS. 1-4. The UEs 115 may be included in groups 505 of sidelink UEs 115, where each group 505 may be assigned a group configured uplink resource for idle mode uplink transmissions to base station 105-*d*.

To avoid collision between UEs 115, each group configured uplink resource may be used by a single, respective UE 115 in one occasion, unless relaying is applied to enhance the uplink transmission to base station 105-*d* (e.g., relaying same information or data). In a first example, a group configured uplink resource allocated to a group of UEs 115 may be used within a group configured uplink resource occasion by one UE 115 to transmit uplink data to the network. For example, UE 115-*n* may use a group configured uplink resource occasion allocated to group 505-*a* to transmit uplink data to base station 105-*d*. The first example may also include a case where one UE 115 relays uplink data originated from another UE 115 in the group 505. For example, UE 115-*o* may use a group configured uplink resource occasion allocated to group 505-*b* to transmit uplink data to base station 105-*d*, where the uplink data may be relayed from UE 115-*p* to UE 115-*o*.

In a second example, a group configured uplink resource allocated to a group 505 of UEs 115 may be used within a group configured uplink resource occasion by multiple UEs 115 to transmit same uplink data to the network. For example, UEs 115-*q* and 115-*r* may use a group configured uplink resource occasion allocated to group 505-*c* to transmit uplink data to base station 105-*d*, where the uplink data may be relayed from UE 115-*r* to UE 115-*q* (e.g., for overlapping or simultaneous transmission). The transmissions of the uplink data by UEs 115-*q* and 115-*r* may at least partially overlap in time, frequency, or both (e.g., may overlap within the group configured uplink resource occasion). The second example may represent spatial repetition, for example, when a UE 115 (e.g., a reduced capability UE 115) may have limited uplink transmit power.

In any of the examples described herein, a relay may be initiated by a first UE 115 originating the uplink data (e.g., may be requested by the first UE 115) or may be initiated by a second UE 115 (e.g., within a same group 505) offering a relay service to the first UE 115. A transmitting UE 115 (e.g., UE 115-*n*, 115-*o*, 115-*q*, or 115-*r*) may include an identity (e.g., an identifier (ID)) in the uplink transmission to indicate a UE 115 that generated (e.g., originally generated) the uplink data.

As described herein, relaying an uplink transmission to base station 105-*d* may enhance an uplink coverage of the network and may decrease power consumption (e.g., save power) at a UE 115 (e.g., a reduce capacity UE 115). A UE 115 in a group 505 may therefore transmit uplink data in a group configured uplink resource according to one or more examples. In a first example, the uplink data may be directly transmitted to base station 105-*d* on the group configured uplink resource (e.g., in a group configured uplink resource occasion). In a second example, the uplink data may be transmitted to both base station 105-*d* and one or more relay UEs 115 in the group 505, over the group configured uplink resource (e.g., in a group configured uplink resource occasion). The one or more relay UEs 115 may further transmit the uplink data to base station 105-*d* in a later group configured uplink resource occasion. For example, UE 115-*r* may transmit same uplink data to base station 105-*d* and UE 115-*q* (e.g., for future relay) in a same group configured uplink resource occasion. UE 115-*q* may then relay the uplink data to base station 105-*d* in a following group configured uplink resource occasion.

In a third example, a UE 115 may transmit uplink data to one or more relay UEs 115 (e.g., via sidelink) before a group configured uplink resource occasion, and both the UE 115 and the one or more relay UEs 115 may transmit the same uplink data in the group configured uplink resource occasion (e.g., to base station 105-*d*). For example, UE 115-*r* may alternatively transmit uplink data to UE 115-*q* before a group configured uplink resource occasion, and both UE 115-*q* and UE 115-*r* may transmit the uplink data to base station 105-*d* in the group configured uplink resource occasion (e.g., least partially overlapping in time, frequency, or both). Transmitting uplink data in a same group configured uplink resource occasion may increase the total transmit power for the uplink data. Doing so may increase communication quality (e.g., among other metrics), for example, when the group of UEs 115 is at a cell edge or otherwise located at a distance from base station 105-*d*.

When the group configured uplink resource is shared by a group of UEs 115, the group of UEs 115 may decide which UE 115 may use the group configured uplink resource (e.g., may use a group configured uplink resource occasion), and when. This decision may be made in a centralized way, such as when a controller UE 115 exists in the group 505, or may be made based on requests from each UE 115 to the rest of the group.

In a first example, use of the group configured uplink resource may be allocated by a controller UE 115 in the group 505. For example, in a group 505 (e.g., group 505-*b*) with one eMBB UE 115 and multiple reduced capability UEs 115, the eMBB UE 115 may be the controller UE 115. Such a group 505 may be represented by group 505-*b*, where UE 115-*o* may represent an eMBB UE 115 and the other UEs 115 (e.g., including UE 115-*p*) may represent reduced capability UEs 115. The controller UE 115 may either determine a pattern for different UEs 115 to use the group configured uplink resource, or may allocate the group configured uplink resource to a UE 115 based on a request from that UE 115 (e.g., a broadcast request). For example, UE 115-*p* may transmit a request to UE 115-*o* and UE 115-*o* may allocate a group configured uplink resource occasion to UE 115-*p* based on the request. Additionally or alternatively, UE 115-*o* may independently allocate group configured uplink resource occasions to other UEs 115 of group 505-*b* (e.g., including UE 115-*p*).

In a second example, a UE 115 may reserve a group configured uplink resource for a time duration (e.g., one or multiple occasions). For example, the UE 115 may transmit a request (e.g., broadcast to other UEs 115 of the group 505) to reserve the group configured uplink resource (e.g., to reserve one or multiple occasions) in a sidelink control information (SCI). Once the group configured uplink resource is reserved by a UE 115, the group configured uplink resource (e.g., the one or multiple occasions reserved by the UE 115) may not be reserved by another UE 115 (e.g., may be restricted from being reserved). The time duration (e.g., the one or multiple occasions) that a group configured uplink resource may be continuously reserved by a UE 115 may have a limit or threshold (e.g., a threshold amount of time or number of occasions). The limit may, for example, be stored at the UEs 115 or may be signaled by base station 105-*d*, and may restrict a UE 115 from reserving the group configured uplink resource for a time duration greater than the limit.

In any of the examples described herein, if multiple group configured uplink resources are configured to a group 505, one UE 115 may be allocated, or may reserve, more than one group configured uplink resource at a time (e.g., may be allocated or reserve one or multiple respective occasions of more than one group configured uplink resource). For example, a UE 115 may be allocated multiple group configured uplink resources by a controller UE 115, or a UE 115 may transmit an SCI reserving multiple group configured uplink resources. Because not all UEs 115 in a group 505 may necessarily try to use a group configured uplink resource simultaneously, an actual usable resource (e.g., a usable amount of resources) for each UE 115 at one time may be greater than an average amount of resources per UE 115 that are configured to the group 505.

Figure 6:
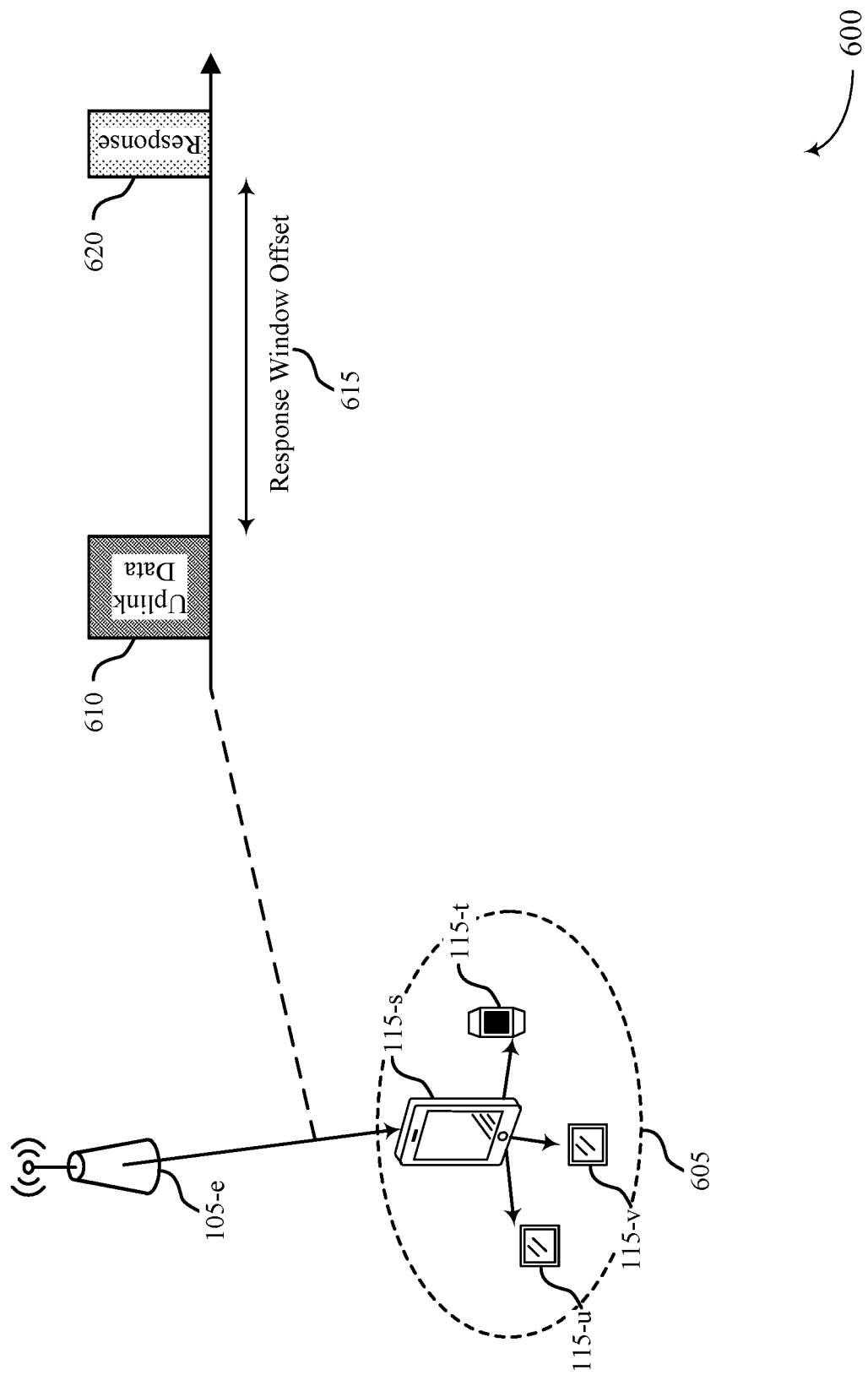
FIG. 6 illustrates an example of a wireless communications system in accordance with aspects of the present disclosure.

FIG. 6 illustrates an example of a wireless communications system 600 in accordance with aspects of the present disclosure. In some examples, wireless communications system 600 may implement some aspects of wireless communications system 100 or 200. In some examples, wireless communications system 600 may implement or be implemented by some aspects of wireless communications system 300 or 500, or process flow 400. Wireless communications system 600 may include a base station 105-$e$ and UEs 115-$s$, 115-$t$, 115-$u$, and 115-$v$, which may represent respective examples of a base station 105 and UEs 115 described with reference to FIGS. 1-5. The UEs 115 may be included in a group 605 of sidelink UEs 115, where the group 605 may be assigned a group configured uplink resource for idle mode uplink transmissions to base station 105-$e$.

As described herein with reference to FIG. 2, base station 105-$e$ may transmit a configured uplink resource response (e.g., a response 620) once base station 105-$e$ receives an uplink transmission (e.g., uplink data 610) in the allocated resource (e.g., the group configured uplink resource). For example, base station 105-$e$ may transmit the configured uplink resource response once it receives the uplink transmission from any UE 115 of the group 605 on the allocated group configured uplink resource. In a first example, a UE 115 (e.g., UE 115-$s$) that transmits the uplink data 610 in the group configured uplink resource occasion may receive the configured uplink resource response (e.g., from base station 105-$e$) in a configured response window 615 (e.g., a configured uplink resource response window).

In a second example, a controller UE 115 may receive the configured uplink resource response (e.g., in the response window 615), where the controller UE 115 (e.g., a control node) may be a same UE 115 or a different UE 115 than a UE 115 that transmits the uplink data 610. For example, UE 115-$s$ may represent a cell phone (e.g., a controller UE 115) that receives the configured uplink resource response for wearables (e.g., UEs 115-$t$, 115-$u$, and 115-$v$) in a cluster or group 605. In such cases, UE 115-$s$ may forward or relay the configured uplink resource response to one or more other UEs 115 of the group 605.

In a third example, multiple UEs 115 may receive the configured uplink resource response. For example, as described with reference to FIG. 5, if multiple UEs 115 transmit the uplink data 610 (e.g., for coverage enhancement) they can also receive the configured uplink resource response, which may enhance downlink coverage (e.g., in cases where enhanced downlink coverage may be needed). In one example, UE 115-$s$ and UE 115-$t$ (e.g., among other UEs 115) may both receive the configured uplink resource response (e.g., based on both UE 115-$s$ and 115-$t$ transmitting the uplink data 610).

If one or multiple UEs 115 detect a timing advance command or a group configured uplink resource configuration update in the configured uplink resource response, the one or multiple UEs 115 may propagate (e.g., relay, transmit) the information to other UEs 115 (e.g., one or more other UEs 115) in the group 605. From a next group configured uplink resource occasion, UEs 115 in the group 605 may use the adjusted timing advance and/or group configured uplink resource configuration for uplink transmissions to base station 105-$e$.

Figure 7:
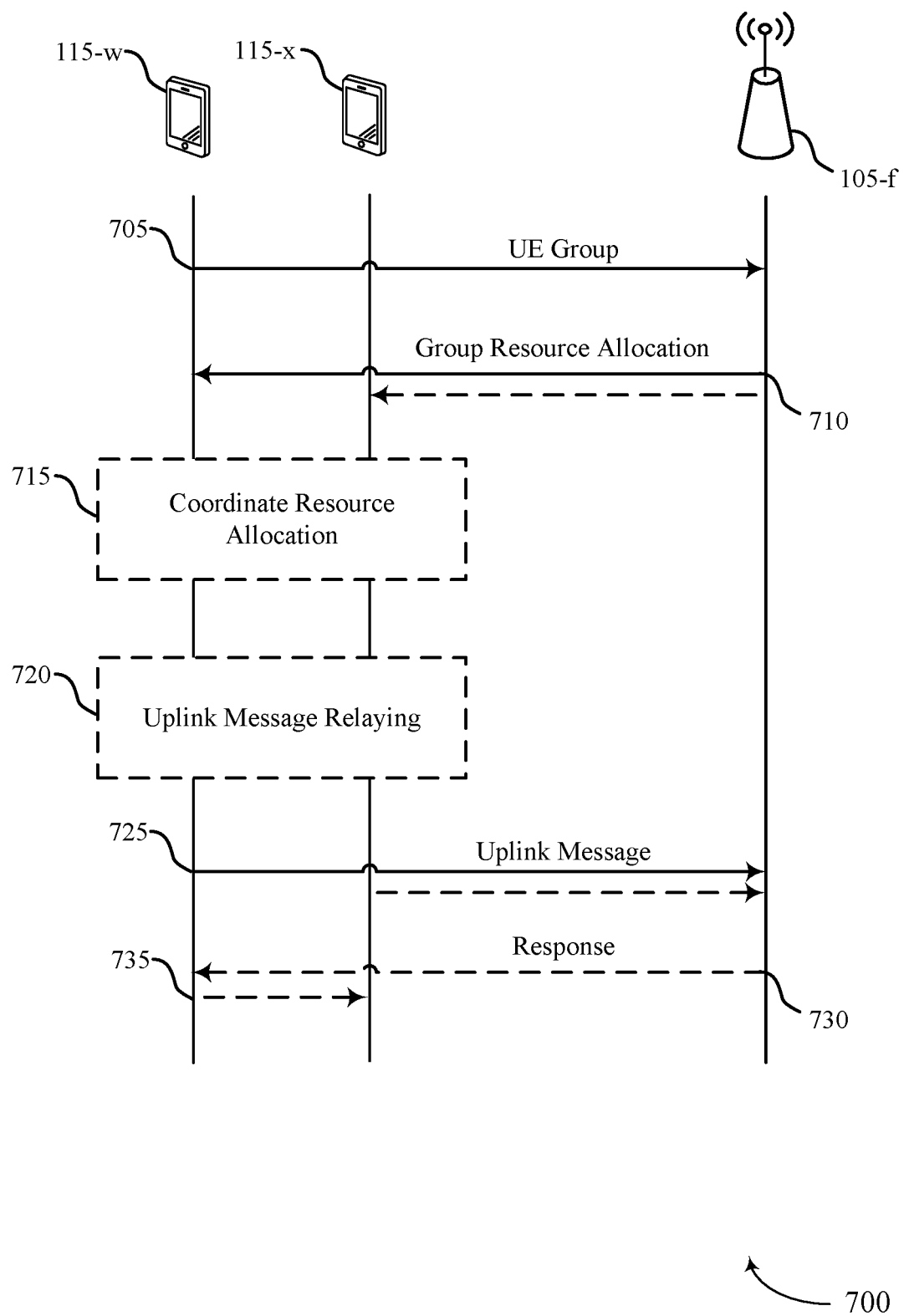
FIG. 7 illustrates an example of a process flow in accordance with aspects of the present disclosure.

FIG. 7 illustrates an example of a process flow 700 in accordance with aspects of the present disclosure. In some examples, process flow 700 may implement or be implemented by some aspects of wireless communications system 100 or 200. In some examples, process flow 700 may implement or be implemented by some aspects of wireless communications system 300, 500, or 600, or process flow 400. Process flow 700 may be implemented by a base station 105-$f$ and UEs 115-$w$ and 115-$x$, which may represent respective examples of a base station 105 and UEs 115 described with reference to FIGS. 1-6. UEs 115-$w$ and 115-$x$ may represent UEs 115 in a group of sidelink UEs 115, where the group may be assigned a group configured uplink resource for idle mode uplink transmissions to base station 105-$f$.

In the following description of process flow 700, the operations may be performed in a different order than the order shown, or the operations performed by UE 115-$w$, UE 115-$x$, and base station 105-$f$ may be performed in different orders or at different times. For example, specific operations may also be left out of process flow 700, or other operations may be added to process flow 700. Although UE 115-$w$, UE 115-$x$, and base station 105-$f$ are shown performing the operations of process flow 700, some aspects of some operations may also be performed by one or more other wireless devices.

At 705, UE 115-$w$ may transmit, to base station 105-$f$, an indication of a UE group that includes multiple sidelink UEs 115 (e.g., including UEs 115-$w$ and 115-$x$). For example, UE 115-$w$ may transmit the indication of the UE group based on forming or joining the UE group. In some cases, UE 115-$w$ may transmit the indication of the UE group based on entering, or preparing to enter, an idle mode. For example, the UE 115-$w$ may transmit the indication as a control message that includes a group ID of the group.

At 710, base station 105-$f$ may transmit a group resource allocation message indicating an uplink group resource occasion allocated to at least one sidelink UE 115 of the multiple sidelink UEs 115, for idle mode uplink transmission. The group resource allocation message may indicate, for example, a single or multiple occasions of a group configured uplink resource (e.g., configured for at least one sidelink UE of the group of sidelink UEs 115). In some cases, the group resource allocation message may indicate a threshold (e.g., a limit) number of continuous uplink transmissions for which one UE 115 of the group may use the uplink group resource occasion. In some cases, base station 105-$f$ may indicate the threshold via another transmission (e.g., via configuration signaling).

In some cases, the group resource allocation message may an uplink group resource response occasion that corresponds to the uplink group resource occasion. In some cases, base station 105-$f$ may indicate the uplink group resource response occasion via another transmission (e.g., via configuration signaling). In some cases, UE 115-$w$ (e.g., or another UE 115 of the group) may transmit a request for a group resource for idle mode uplink transmissions for the UE group, and base station 105-$f$ may transmit the group resource allocation message based on receiving the request for the group resource. For example, UE 115-$w$ may transmit the request for the group resource via the indication of the UE group, or via another transmission to base station 105-$f$.

In some cases, base station 105-$f$ may transmit the group resource allocation message to a subset of UEs 115 of the group (e.g., including UE 115-$w$), and the subset of UEs 115 (e.g., UE 115-$w$) may forward or transmit an indication of the group resource allocation to one or more other UEs 115 of the group (e.g., to UE 115-$x$). In some cases, base station 105-$f$ may transmit the group resource allocation message to each UE 115 of the group.

At 715, in some cases, UEs 115-*w* and 115-*x* (e.g., among other UEs 115 of the group) may coordinate resource allocation for the uplink group resource occasion. In a first example, as described herein, a controller UE 115 may coordinate resource allocation for the UE group. For example, UE 115-*x* may represent a controller UE 115 and may allocate the uplink group resource occasion (e.g., transmit an allocation message indicating the allocation) to UE 115-*w* independently or based on a request from UE 115-*w* (e.g., an allocation request message requesting the uplink group resource occasion). In a second example, a UE 115 of the group may transmit a sidelink control message (e.g., SCI) to reserve the uplink group resource occasion. For example, UE 115-*w* may detect that the uplink group resource occasion is unreserved (e.g., based on previously received sidelink control messages from other UEs 115 of the group) and may transmit (e.g., broadcast) a sidelink control message reserving the uplink group resource occasion to multiple UEs 115 of the group.

At 720, in some cases, UEs 115-*w* and 115-*x* may perform relaying for an uplink message for transmission using the uplink group resource occasion. For example, UE 115-*w* may transmit uplink data for the uplink message to UE 115-*x*, for UE 115-*x* to transmit to base station 105-*f* (e.g., along with a transmission of the uplink message from UE 115-*w* to base station 105-*f*). As described herein, UE 115-*w* may transmit the uplink data during the uplink group resource occasion (e.g., for later transmission by UE 115-*x*) or may transmit the uplink data before the uplink group resource occasion (e.g., for transmission to base station 105-*f* during the uplink group resource occasion). In some cases, UE 115-*x* may transmit uplink data to UE 115-*w*, for UE 115-*w* to transmit to base station 105-*f* during the uplink group resource occasion (e.g., where UE 115-*x* may not transmit the uplink data to base station 105-*f*).

At 725, UE 115-*w* may transmit, in idle mode, the uplink message (e.g., including the uplink data) to base station 105-*f* during the uplink group resource occasion, based on receiving the group resource allocation message (e.g., and based on coordinating the resource allocation and/or performing relaying). In some cases, UE 115-*x* may also transmit a second uplink message (e.g., including the uplink data) to base station 105-*f*. For example, UE 115-*x* may transmit the second uplink message in the uplink group resource occasion (e.g., at least partially overlapping with the uplink message transmitted by UE 115-*w*, such as at least partially overlapping in time, frequency, or both) or in a second uplink group resource occasion after the uplink group resource occasion.

At 730, in some cases, base station 105-*f* may transmit, to UE 115-*w*, a response to the uplink message in an uplink group resource response occasion corresponding to the uplink group resource occasion. In some cases, the response may include an indication of a timing advance command or an adjustment to the uplink group resource occasion. In such cases, at 735, UE 115-*w* may forward or transmit an indication of the timing advance command or the adjustment to the uplink group resource occasion to one or more other UEs 115 of the group (e.g., to UE 115-*x*). In some cases, if the uplink data of the uplink message originated at UE 115-*x* (e.g., or if UE 115-*x* also transmitted the uplink data to base station 105-*f*), UE 115-*w* may forward or transmit an indication of the response to UE 115-*x* at 735.

Figure 8:
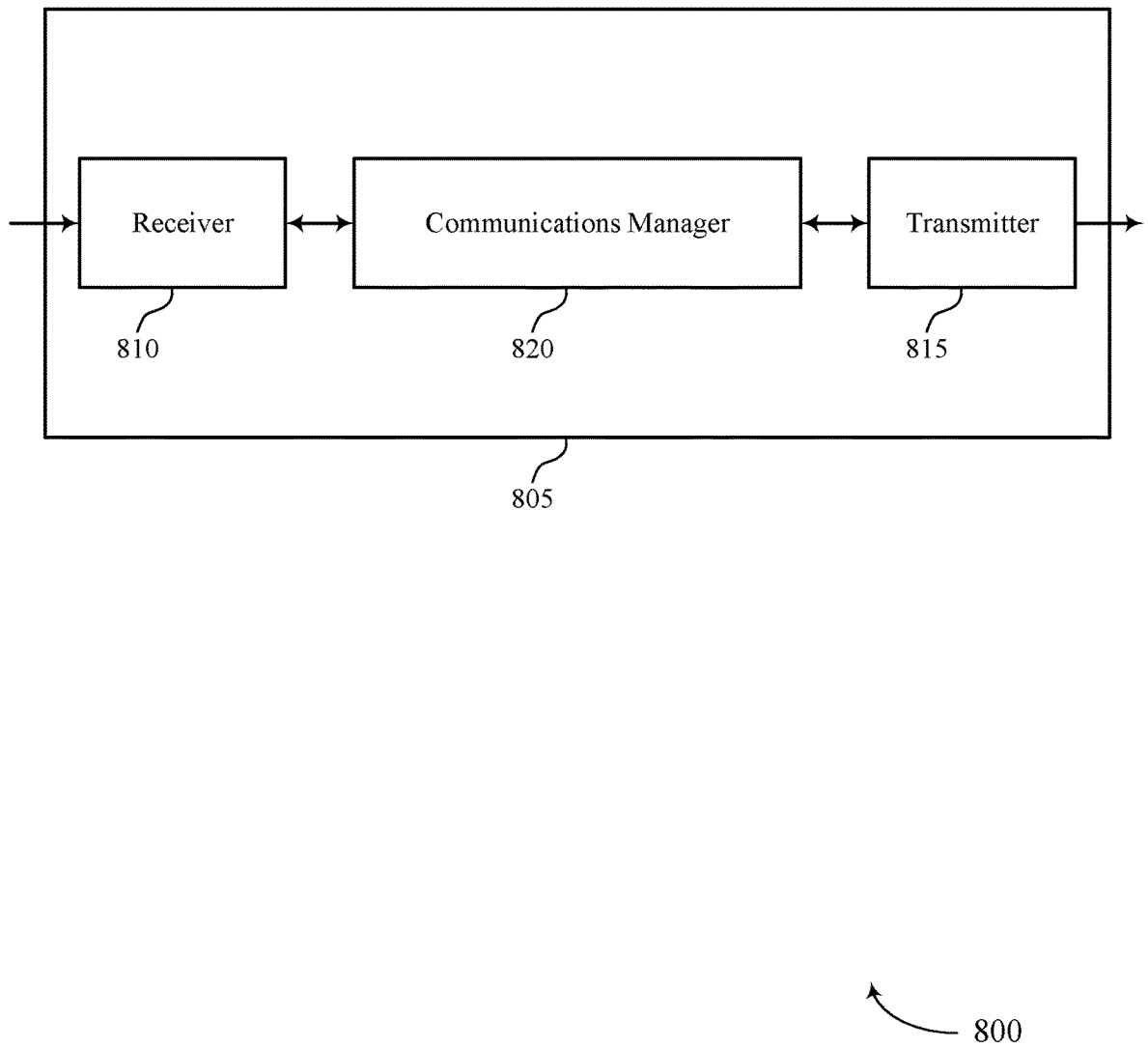
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink resource sharing for sidelink devices). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink resource sharing for sidelink devices). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of uplink resource sharing for sidelink devices as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. For example, the communications manager 820 may be configured as or otherwise support a means for transmitting, to a base station, an indication of a UE group including a set of multiple sidelink UEs. The communications manager 820 may be configured as or otherwise support a means for receiving a group resource allocation message indicating an uplink group resource occasion allocated to at least one sidelink UE of the set of multiple sidelink UEs for idle mode uplink transmission. The communications manager 820 may be configured as or otherwise support a means for transmitting, in idle mode, an uplink message to the base station during the uplink group resource occasion based on receiving the group resource allocation message.

The actions performed by the communications manager 820, among other examples herein, may be implemented to realize one or more potential advantages. For example, communications manager 820 may increase available battery power and communication quality at a wireless device (e.g., a UE 115) by supporting allocation and use of a group configured uplink resource. The increase in communication quality may result in increased link performance and decreased overhead based on using the group configured uplink resource for idle mode transmissions. Accordingly, communications manager 820 may save power and increase battery life at a wireless device (e.g., a UE 115) by strategically increasing a quality of communications at a wireless device (e.g., a UE 115).

Figure 9:
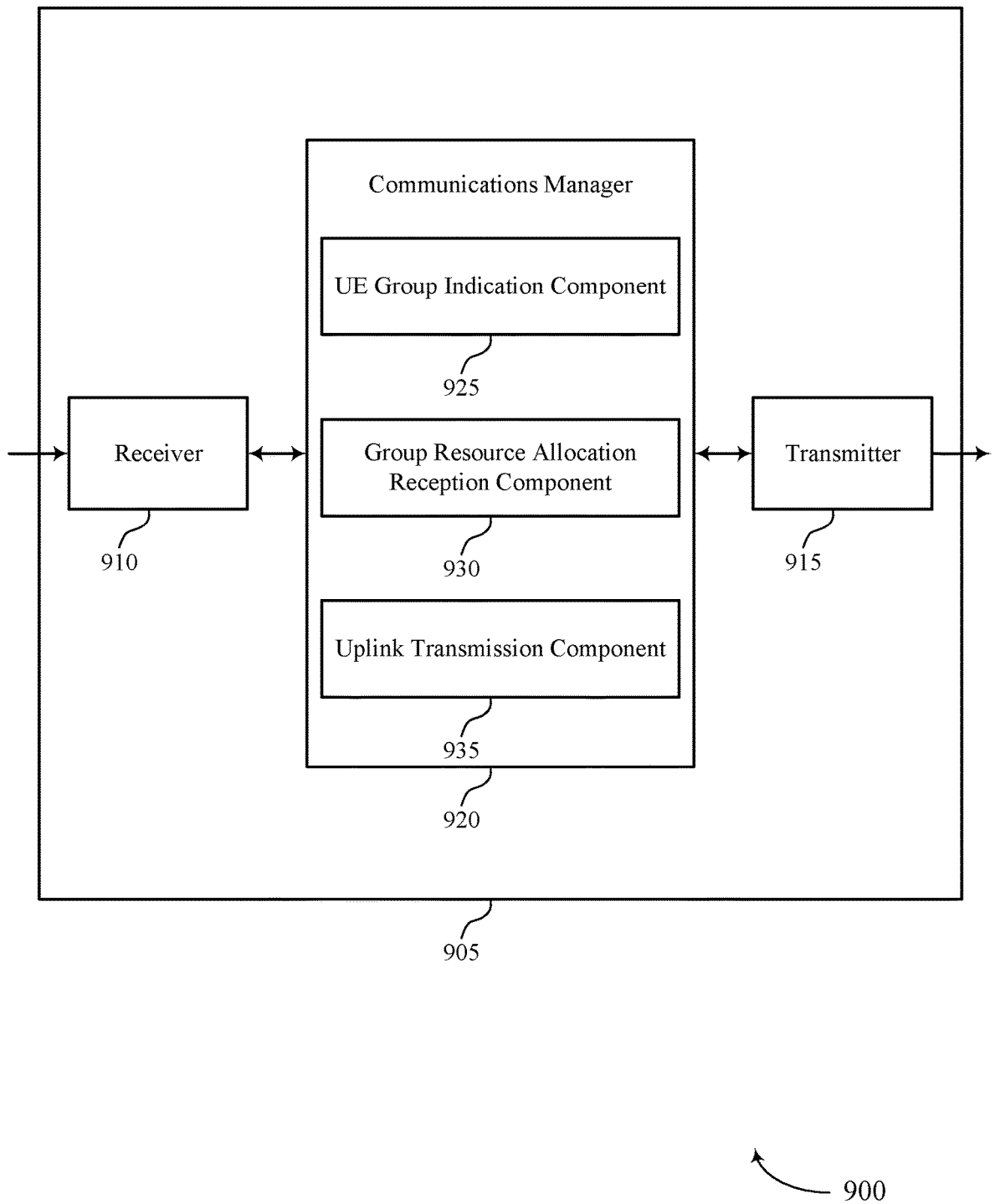

FIG. 9 shows a block diagram 900 of a device 905 in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink resource sharing for sidelink devices). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink resource sharing for sidelink devices). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of uplink resource sharing for sidelink devices as described herein. For example, the communications manager 920 may include a UE group indication component 925, a group resource allocation reception component 930, an uplink transmission component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. The UE group indication component 925 may be configured as or otherwise support a means for transmitting, to a base station, an indication of a UE group including a set of multiple sidelink UEs. The group resource allocation reception component 930 may be configured as or otherwise support a means for receiving a group resource allocation message indicating an uplink group resource occasion allocated to at least one sidelink UE of the set of multiple sidelink UEs for idle mode uplink transmission. The uplink transmission component 935 may be configured as or otherwise support a means for transmitting, in idle mode, an uplink message to the base station during the uplink group resource occasion based on receiving the group resource allocation message.

A processor of a wireless device (e.g., controlling the receiver 910, the transmitter 915, or the transceiver 1215 as described with reference to FIG. 11) may increase available battery power and communication quality. The increased communication quality may increase available battery power and throughput (e.g., via implementation of system components described with reference to FIG. 10) compared to other systems and techniques, for example, that do not support a group configured uplink resource. Further, the processor of the wireless device may identify one or more aspects of the group configured uplink resource to perform transmissions on the group configured uplink resource, which may result in increased communication quality, as well as save power and increase battery life at the wireless device (e.g., by strategically supporting increased communication quality by using the group configured uplink resource), among other benefits.

Figure 10:
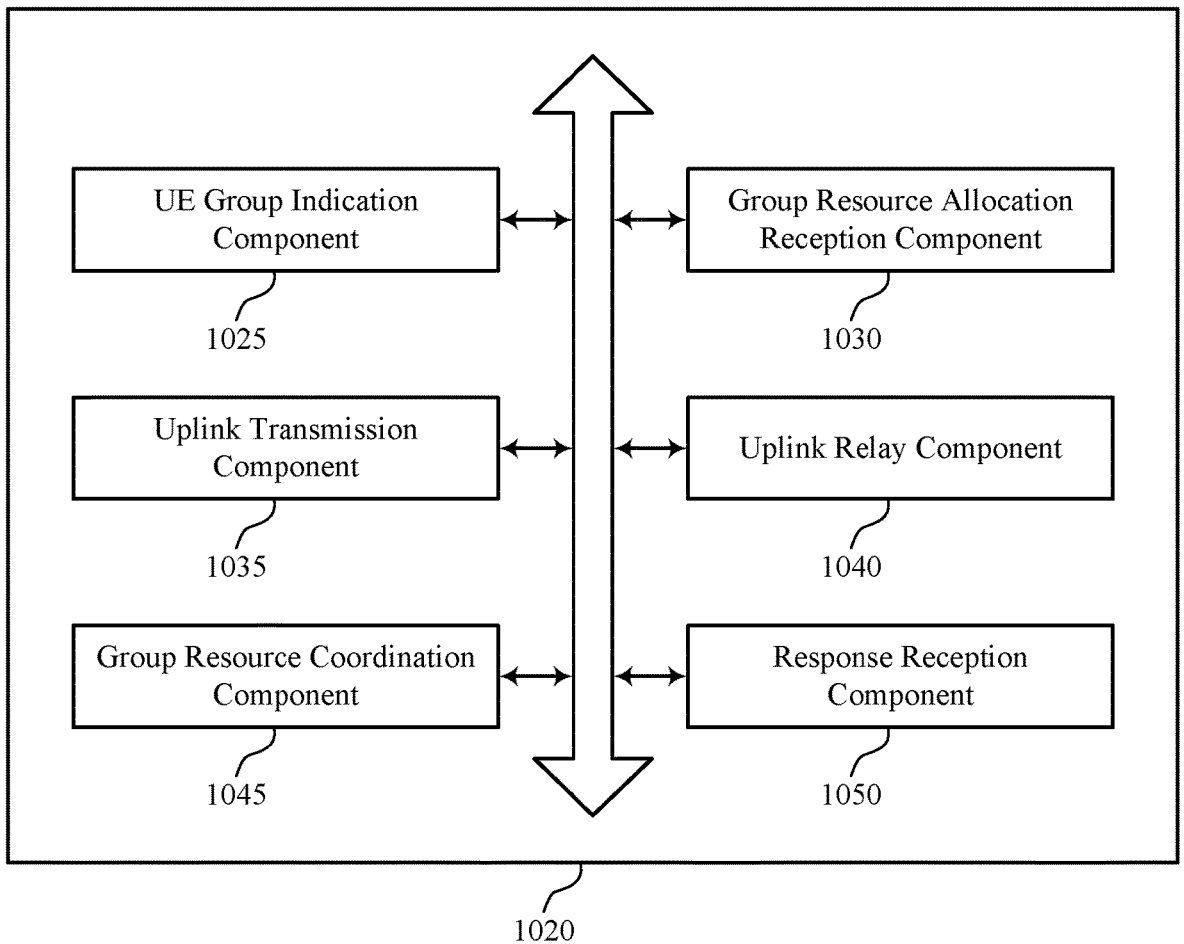
FIG. 10 shows a block diagram of a communications manager in accordance with aspects of the present disclosure.

FIG. 10 shows a block diagram 1000 of a communications manager 1020 in accordance with aspects of the present disclosure. The communications manager 1020 may be an example of aspects of a communications manager 820, a communications manager 920, or both, as described herein. The communications manager 1020, or various components thereof, may be an example of means for performing various aspects of uplink resource sharing for sidelink devices as described herein. For example, the communications manager 1020 may include a UE group indication component 1025, a group resource allocation reception component 1030, an uplink transmission component 1035, an uplink relay component 1040, a group resource coordination component 1045, a response reception component 1050, or any combination thereof. Each of these components may communicate, directly or indirectly, with one another (e.g., via one or more buses).

The communications manager 1020 may support wireless communication at a first UE in accordance with examples as disclosed herein. The UE group indication component 1025 may be configured as or otherwise support a means for transmitting, to a base station, an indication of a UE group including a set of multiple sidelink UEs. The group resource allocation reception component 1030 may be configured as or otherwise support a means for receiving a group resource allocation message indicating an uplink group resource occasion allocated to at least one sidelink UE of the set of multiple sidelink UEs for idle mode uplink transmission. The uplink transmission component 1035 may be configured as or otherwise support a means for transmitting, in idle mode, an uplink message to the base station during the uplink group resource occasion based on receiving the group resource allocation message.

In some examples, to support transmitting the indication of the UE group, the UE group indication component 1025 may be configured as or otherwise support a means for transmitting a request for a group resource for idle mode uplink transmissions for the UE group, where receiving the group resource allocation message is based on transmitting the request.

In some examples, to support receiving the group resource allocation message, the group resource allocation reception component 1030 may be configured as or otherwise support a means for receiving the group resource allocation message from the base station indicating the uplink group resource occasion is allocated to a first subset of the set of multiple sidelink UEs, where the first subset includes the first UE. In some examples, the group resource allocation reception component 1030 may be configured as or otherwise support a means for transmitting an indication of the uplink group resource occasion to one or more second UEs of a second subset of the set of multiple sidelink UEs based on receiving the group resource allocation message.

In some examples, to support receiving the group resource allocation message, the group resource allocation reception component 1030 may be configured as or otherwise support a means for receiving the group resource allocation message from the base station indicating the uplink group resource occasion is allocated to the set of multiple sidelink UEs of the UE group. In some examples, the group resource allocation message includes a group ID associated with the UE group.

In some examples, to support receiving the group resource allocation message, the group resource allocation reception component 1030 may be configured as or otherwise support a means for receiving an RRC release message including the group resource allocation message. In some examples, to support receiving the group resource allocation message, the group resource allocation reception component 1030 may be configured as or otherwise support a means for receiving, operating in a connected mode, an RRC message including the group resource allocation message.

In some examples, the uplink relay component 1040 may be configured as or otherwise support a means for receiving, from a second UE of the set of multiple sidelink UEs, a sidelink message indicating uplink data to transmit to the base station via the uplink message during the uplink group resource occasion, where transmitting the uplink message to the base station is based on receiving the sidelink message. In some examples, to support transmitting the uplink message, the uplink transmission component 1035 may be configured as or otherwise support a means for transmitting the uplink message including uplink data at least partially overlapping with a transmission of the uplink data during the uplink group resource occasion by a second UE of the set of multiple sidelink UEs.

In some examples, to support transmitting the uplink message, the uplink transmission component 1035 may be configured as or otherwise support a means for transmitting the uplink message including uplink data and an ID of the first UE or a second UE, where the ID indicates that the uplink data is generated by the first UE or the second UE.

In some examples, the group resource coordination component 1045 may be configured as or otherwise support a means for receiving, from a second UE of the set of multiple sidelink UEs, an allocation message allocating the uplink group resource occasion to the first UE, where transmitting the uplink message in the uplink group resource occasion is based on receiving the allocation message. In some examples, the group resource coordination component 1045 may be configured as or otherwise support a means for transmitting, to the second UE, an allocation request message requesting the uplink group resource occasion for transmission of the uplink message, where receiving the allocation message from the second UE is based on transmitting the allocation request message.

In some examples, the group resource coordination component 1045 may be configured as or otherwise support a means for transmitting, to multiple UEs of the set of multiple sidelink UEs, a sidelink control message reserving the uplink group resource occasion for transmission of the uplink message based on detecting that the uplink group resource occasion is unreserved, where transmitting the uplink message in the uplink group resource occasion is based on transmitting the sidelink control message. In some examples, to support transmitting the uplink message, the uplink transmission component 1035 may be configured as or otherwise support a means for transmitting the uplink message based on a number of continuous uplink transmissions by the first UE satisfying a threshold.

In some examples, the group resource coordination component 1045 may be configured as or otherwise support a means for receiving, from a controller UE of the set of multiple sidelink UEs, an allocation message allocating the uplink group resource occasion and a second uplink group resource occasion to the first UE, where transmitting the uplink message in the uplink group resource occasion is based on receiving the allocation message. In some examples, the uplink transmission component 1035 may be configured as or otherwise support a means for transmitting a second uplink message to the base station during the second uplink group resource occasion based on receiving the allocation message.

In some examples, the group resource coordination component 1045 may be configured as or otherwise support a means for transmitting, to multiple UEs of the set of multiple sidelink UEs, a sidelink control message reserving the uplink group resource occasion and a second uplink group resource occasion, where transmitting the uplink message in the uplink group resource occasion is based on transmitting the sidelink control message. In some examples, the uplink transmission component 1035 may be configured as or otherwise support a means for transmitting a second uplink message to the base station during the second uplink group resource occasion based on transmitting the sidelink control message.

In some examples, to support transmitting the uplink message, the uplink relay component 1040 may be configured as or otherwise support a means for transmitting, during the uplink group resource occasion, the uplink message to one or more second UEs of the set of multiple sidelink UEs for relaying the uplink message to the base station during a second uplink group resource occasion.

In some examples, to support transmitting the uplink message, the uplink relay component 1040 may be configured as or otherwise support a means for receiving, from a second UE of the set of multiple sidelink UEs prior to the uplink group resource occasion, a sidelink message indicating uplink data to transmit to the base station during the uplink group resource occasion. In some examples, to support transmitting the uplink message, the uplink transmission component 1035 may be configured as or otherwise support a means for transmitting the uplink message including the uplink data at least partially overlapping with a transmission of the uplink data during the uplink group resource occasion by the second UE based on receiving the sidelink message.

In some examples, to support receiving the group resource allocation message, the group resource allocation reception component 1030 may be configured as or otherwise support a means for receiving the group resource allocation message indicating an uplink group resource response occasion corresponding to the uplink group resource occasion.

In some examples, the response reception component 1050 may be configured as or otherwise support a means for receiving, from the base station, a response to the uplink message in the uplink group resource response occasion corresponding to the uplink group resource occasion. In some examples, to support receiving the response to the uplink message, the response reception component 1050 may be configured as or otherwise support a means for receiving the response to the uplink message in the uplink group resource response occasion at least partially overlapping with reception of the response to the uplink message during the uplink group resource response occasion at a second UE of the set of multiple sidelink UEs.

In some examples, to support receiving the response to the uplink message, the response reception component 1050 may be configured as or otherwise support a means for receiving the response to the uplink message indicating a timing advance or an update to the uplink group resource occasion. In some examples, to support receiving the response to the uplink message, the response reception component 1050 may be configured as or otherwise support a means for transmitting an indication of the timing advance or the update to the uplink group resource occasion to one or more second UEs of the set of multiple sidelink UEs based on receiving the response to the uplink message.

In some examples, the response reception component 1050 may be configured as or otherwise support a means for receiving, from a second UE of the set of multiple sidelink UEs, a response to the uplink message relayed from the base station based on transmitting the uplink message.

Figure 11:
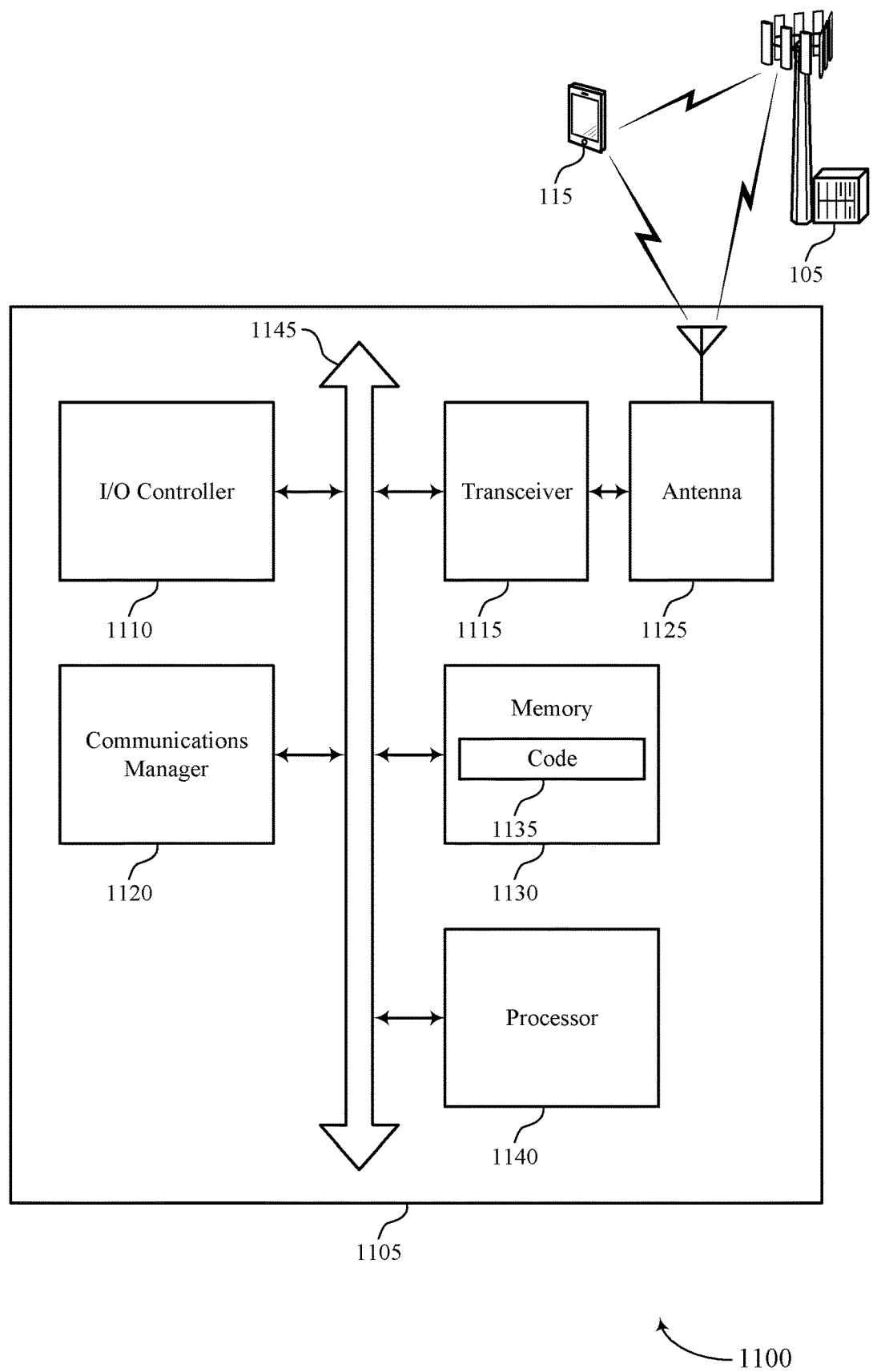
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink resource sharing for sidelink devices). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first UE in accordance with examples as disclosed herein. For example, the communications manager 1120 may be configured as or otherwise support a means for transmitting, to a base station, an indication of a UE group including a set of multiple sidelink UEs. The communications manager 1120 may be configured as or otherwise support a means for receiving a group resource allocation message indicating an uplink group resource occasion allocated to at least one sidelink UE of the set of multiple sidelink UEs for idle mode uplink transmission. The communications manager 1120 may be configured as or otherwise support a means for transmitting, in idle mode, an uplink message to the base station during the uplink group resource occasion based on receiving the group resource allocation message.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of uplink resource sharing for sidelink devices as described herein, or the processor 1140 and the memory 1130 may be otherwise configured to perform or support such operations.

Figure 12:
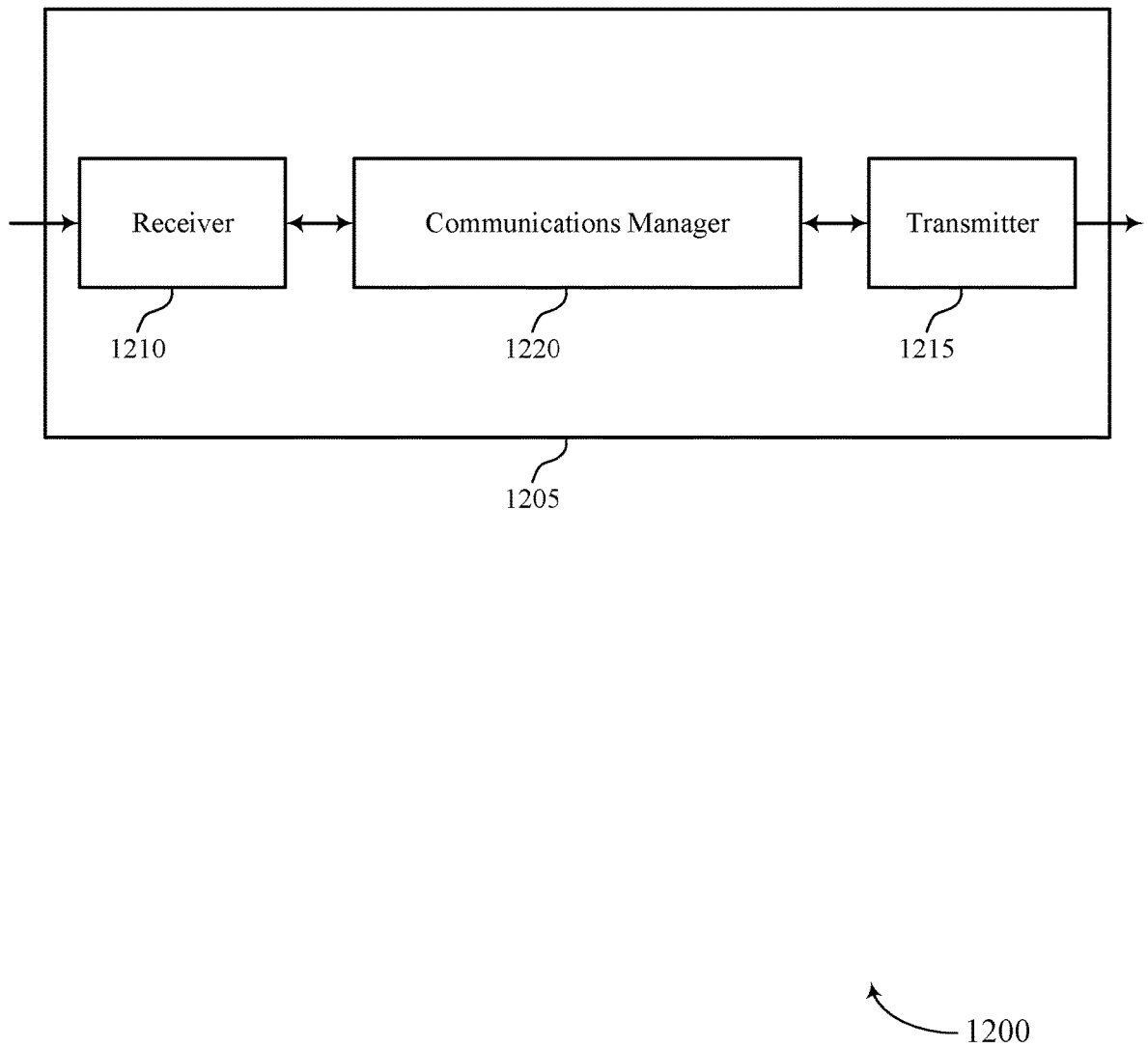
FIGS. 12 and 13 show block diagrams of devices in accordance with aspects of the present disclosure.

FIG. 12 shows a block diagram 1200 of a device 1205 in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to uplink resource sharing for sidelink devices). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to uplink resource sharing for sidelink devices). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of uplink resource sharing for sidelink devices as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for receiving an indication of a UE group that includes a set of multiple sidelink UEs. The communications manager 1220 may be configured as or otherwise support a means for transmitting a group resource allocation message indicating an uplink group resource occasion allocated to at least one sidelink UE of the set of multiple sidelink UEs for idle mode uplink transmission. The communications manager 1220 may be configured as or otherwise support a means for receiving an uplink message from a first UE of the set of multiple sidelink UEs during the uplink group resource occasion.

Figure 13:
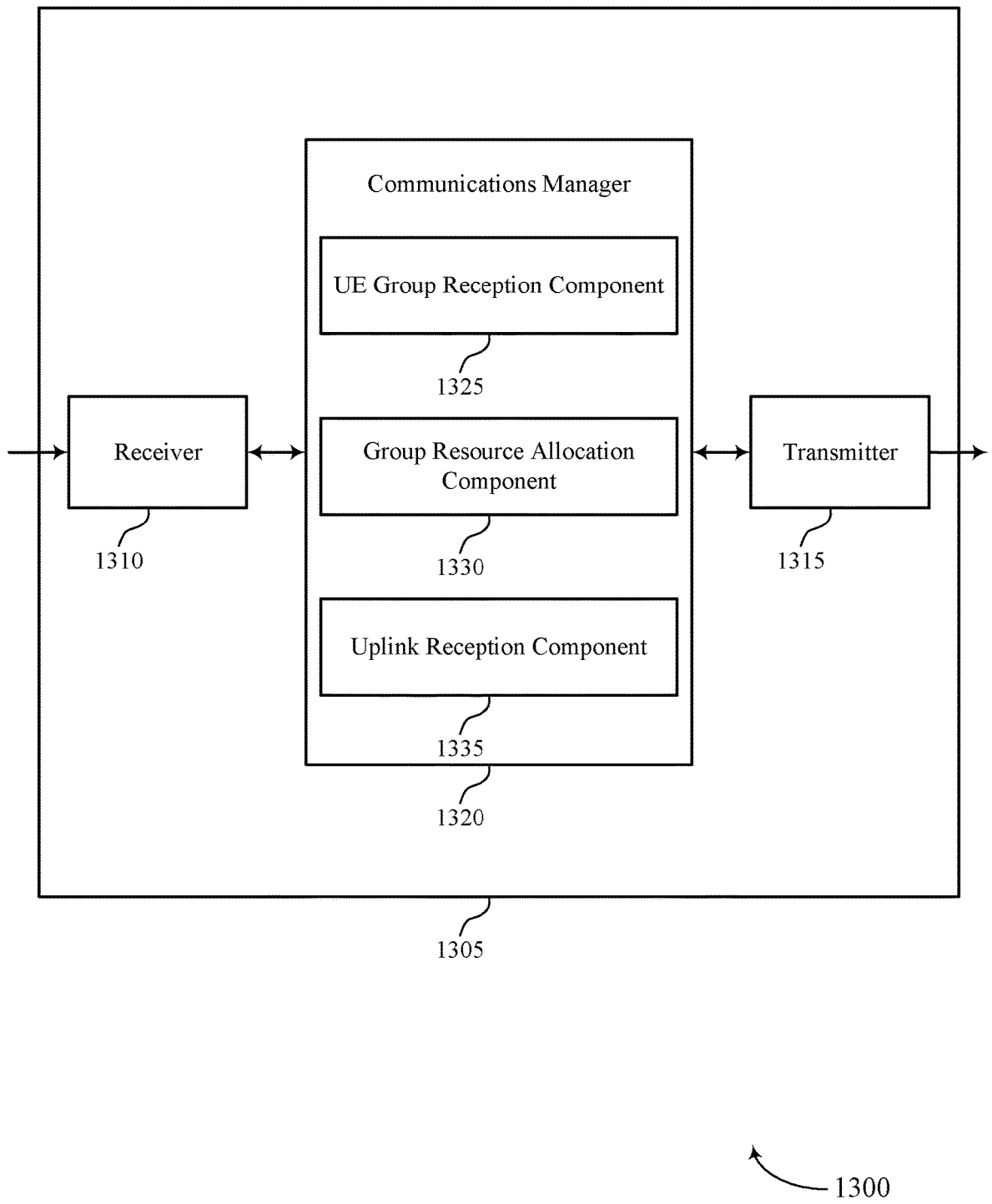

FIG. 13 shows a block diagram 1300 of a device 1305 in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to uplink resource sharing for sidelink devices). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to uplink resource sharing for sidelink devices). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of uplink resource sharing for sidelink devices as described herein. For example, the communications manager 1320 may include a UE group reception component 1325, a group resource allocation component 1330, an uplink reception component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The UE group reception component 1325 may be configured as or otherwise support a means for receiving an indication of a UE group that includes a set of multiple sidelink UEs. The group resource allocation component 1330 may be configured as or otherwise support a means for transmitting a group resource allocation message indicating an uplink group resource occasion allocated to at least one sidelink UE of the set of multiple sidelink UEs for idle mode uplink transmission. The uplink reception component 1335 may be configured as or otherwise support a means for receiving an uplink message from a first UE of the set of multiple sidelink UEs during the uplink group resource occasion.

Figure 14:
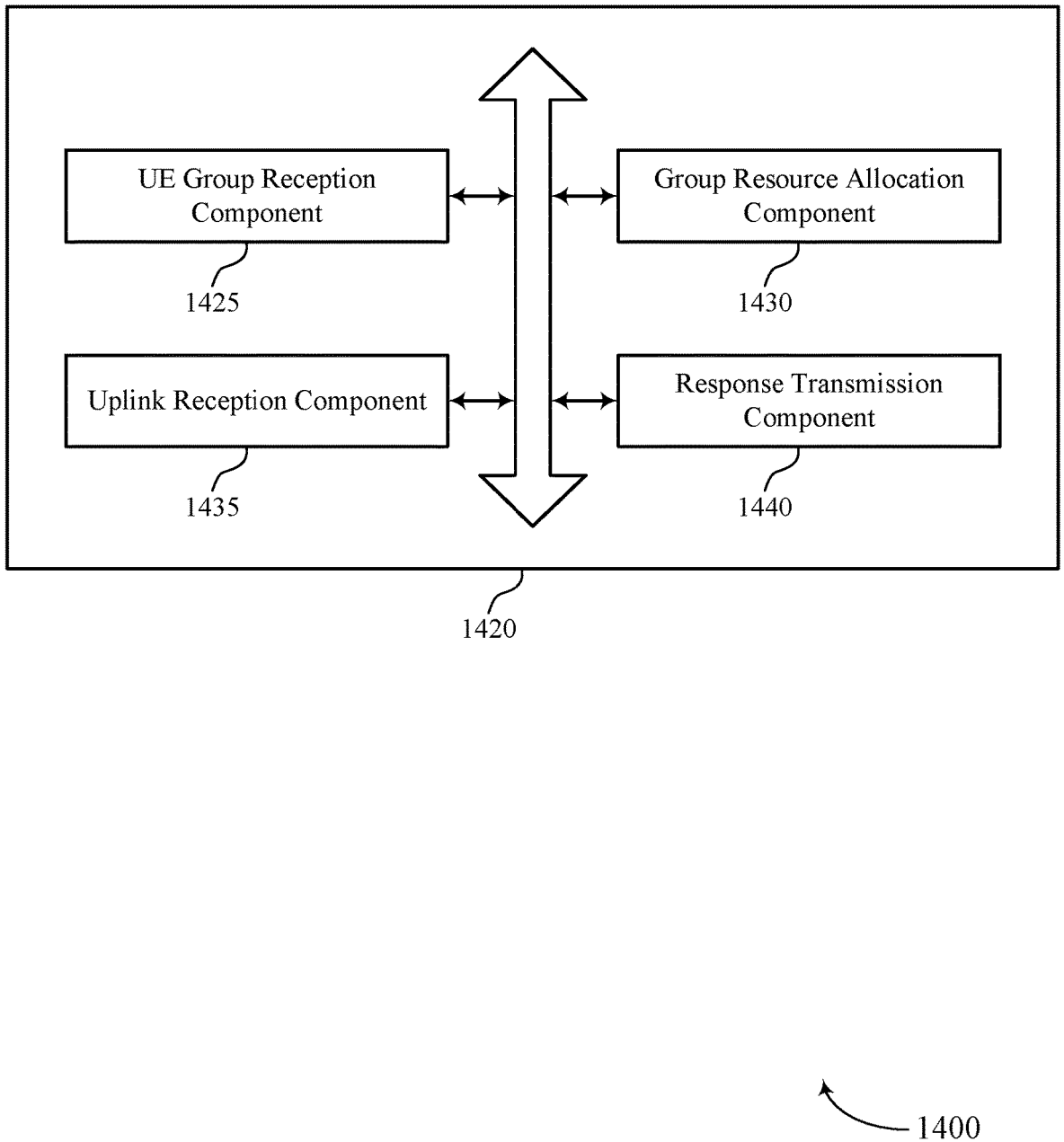
FIG. 14 shows a block diagram of a communications manager in accordance with aspects of the present disclosure.

FIG. 14 shows a block diagram 1400 of a communications manager 1420 in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of uplink resource sharing for sidelink devices as described herein. For example, the communications manager 1420 may include a UE group reception component 1425, a group resource allocation component 1430, an uplink reception component 1435, a response transmission component 1440, or any combination thereof. Each of these components may communicate, directly or indirectly, with one another (e.g., via one or more buses).

The communications manager 1420 may support wireless communication at a base station in accordance with examples as disclosed herein. The UE group reception component 1425 may be configured as or otherwise support a means for receiving an indication of a UE group that includes a set of multiple sidelink UEs. The group resource allocation component 1430 may be configured as or otherwise support a means for transmitting a group resource allocation message indicating an uplink group resource occasion allocated to at least one sidelink UE of the set of multiple sidelink UEs for idle mode uplink transmission. The uplink reception component 1435 may be configured as or otherwise support a means for receiving an uplink message from a first UE of the set of multiple sidelink UEs during the uplink group resource occasion.

In some examples, to support receiving the indication of the UE group, the UE group reception component 1425 may be configured as or otherwise support a means for receiving a request for a group resource for idle mode uplink transmissions for the UE group, where transmitting the group resource allocation message is based on receiving the request.

In some examples, to support transmitting the group resource allocation message, the group resource allocation component 1430 may be configured as or otherwise support a means for transmitting the group resource allocation message indicating the uplink group resource occasion is allocated to a first subset of the set of multiple sidelink UEs, where the first subset includes the first UE. In some examples, to support transmitting the group resource allocation message, the group resource allocation component 1430 may be configured as or otherwise support a means for transmitting the group resource allocation message indicating the uplink group resource occasion is allocated to the set of multiple sidelink UEs of the UE group. In some examples, the group resource allocation message includes a group ID associated with the UE group.

In some examples, to support transmitting the group resource allocation message, the group resource allocation component 1430 may be configured as or otherwise support a means for transmitting an RRC release message including the group resource allocation message. In some examples, to support transmitting the group resource allocation message, the group resource allocation component 1430 may be configured as or otherwise support a means for transmitting an RRC message including the group resource allocation message to the at least one sidelink UE operating in a connected mode.

In some examples, to support receiving the uplink message, the uplink reception component 1435 may be configured as or otherwise support a means for receiving the uplink message from the first UE including uplink data. In some examples, to support receiving the uplink message, the uplink reception component 1435 may be configured as or otherwise support a means for receiving, from a second UE of the set of multiple sidelink UEs, a second uplink message including the uplink data during the uplink group resource occasion.

In some examples, to support receiving the uplink message, the uplink reception component 1435 may be configured as or otherwise support a means for receiving the uplink message including uplink data and an ID of the first UE or a second UE, where the ID indicates that the uplink data is generated by the first UE or the second UE.

In some examples, to support receiving the uplink message, the uplink reception component 1435 may be configured as or otherwise support a means for receiving the uplink message from the first UE including uplink data. In some examples, to support receiving the uplink message, the uplink reception component 1435 may be configured as or otherwise support a means for receiving, during a second uplink group resource occasion after the uplink group resource occasion, a second uplink message including the uplink data from a second UE of the set of multiple sidelink UEs.

In some examples, to support transmitting the group resource allocation message, the group resource allocation component 1430 may be configured as or otherwise support a means for transmitting the group resource allocation message indicating a threshold number of continuous uplink transmissions. In some examples, to support transmitting the group resource allocation message, the group resource allocation component 1430 may be configured as or otherwise support a means for transmitting the group resource allocation message indicating an uplink group resource response occasion corresponding to the uplink group resource occasion.

In some examples, the response transmission component 1440 may be configured as or otherwise support a means for transmitting, to the first UE, a response to the uplink message during the uplink group resource response occasion corresponding to the uplink group resource occasion. In some examples, to support transmitting the response to the uplink message, the response transmission component 1440 may be configured as or otherwise support a means for transmitting, to a second UE of the set of multiple sidelink UEs, the response to the uplink message during the uplink group resource response occasion.

In some examples, the response transmission component 1440 may be configured as or otherwise support a means for transmitting a response to the uplink message indicating a timing advance or an update to the uplink group resource occasion during the uplink group resource response occasion corresponding to the uplink group resource occasion. In some examples, the response transmission component 1440 may be configured as or otherwise support a means for transmitting, to a second UE of the set of multiple sidelink UEs, a response to the uplink message during the uplink group resource response occasion corresponding to the uplink group resource occasion.

Figure 15:
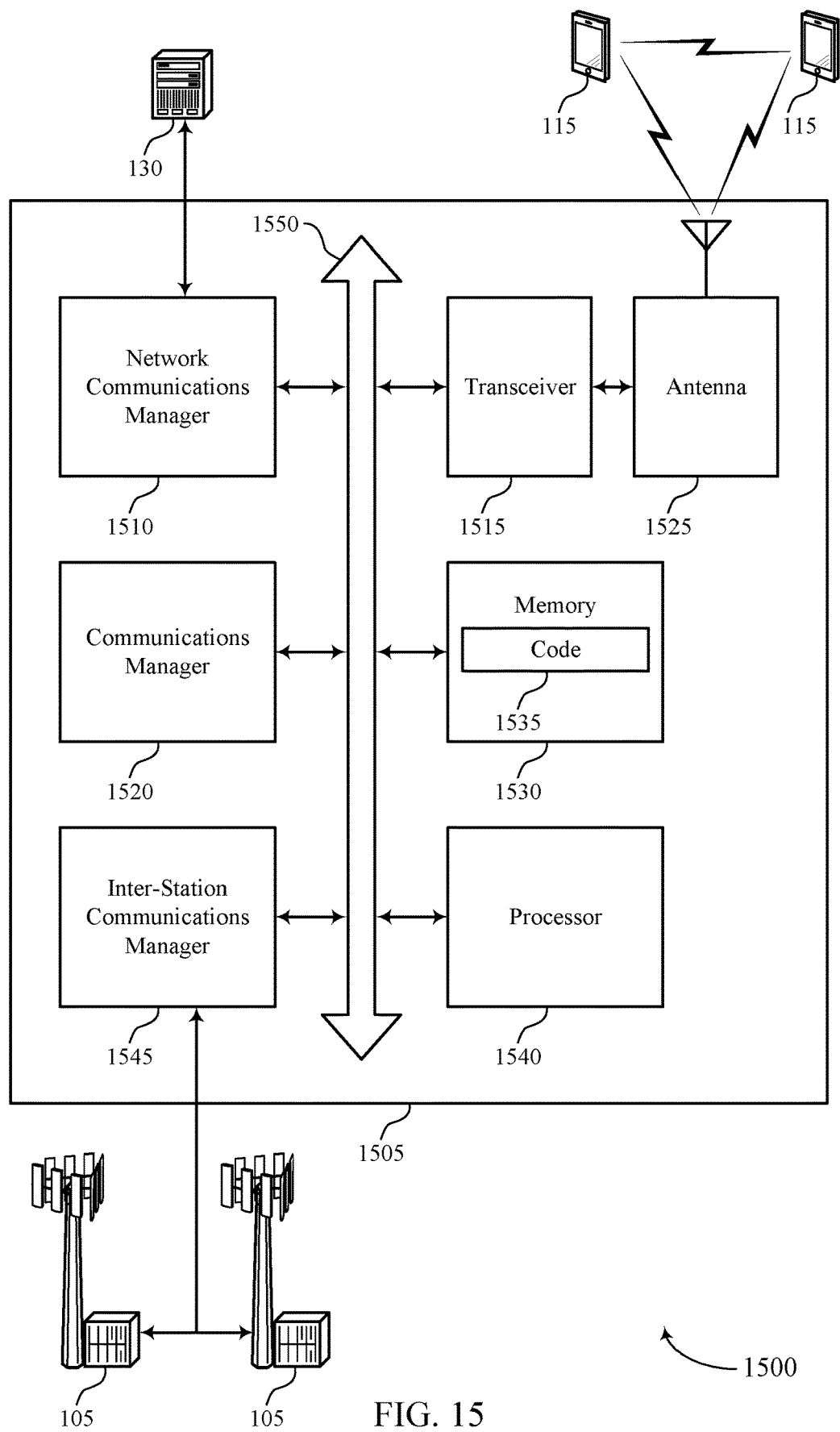
FIG. 15 shows a diagram of a system including a device in accordance with aspects of the present disclosure.

FIG. 15 shows a diagram of a system 1500 including a device 1505 in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting uplink resource sharing for sidelink devices). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for receiving an indication of a UE group that includes a set of multiple sidelink UEs. The communications manager 1520 may be configured as or otherwise support a means for transmitting a group resource allocation message indicating an uplink group resource occasion allocated to at least one sidelink UE of the set of multiple sidelink UEs for idle mode uplink transmission. The communications manager 1520 may be configured as or otherwise support a means for receiving an uplink message from a first UE of the set of multiple sidelink UEs during the uplink group resource occasion.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of uplink resource sharing for sidelink devices as described herein, or the processor 1540 and the memory 1530 may be otherwise configured to perform or support such operations.

Figure 16:
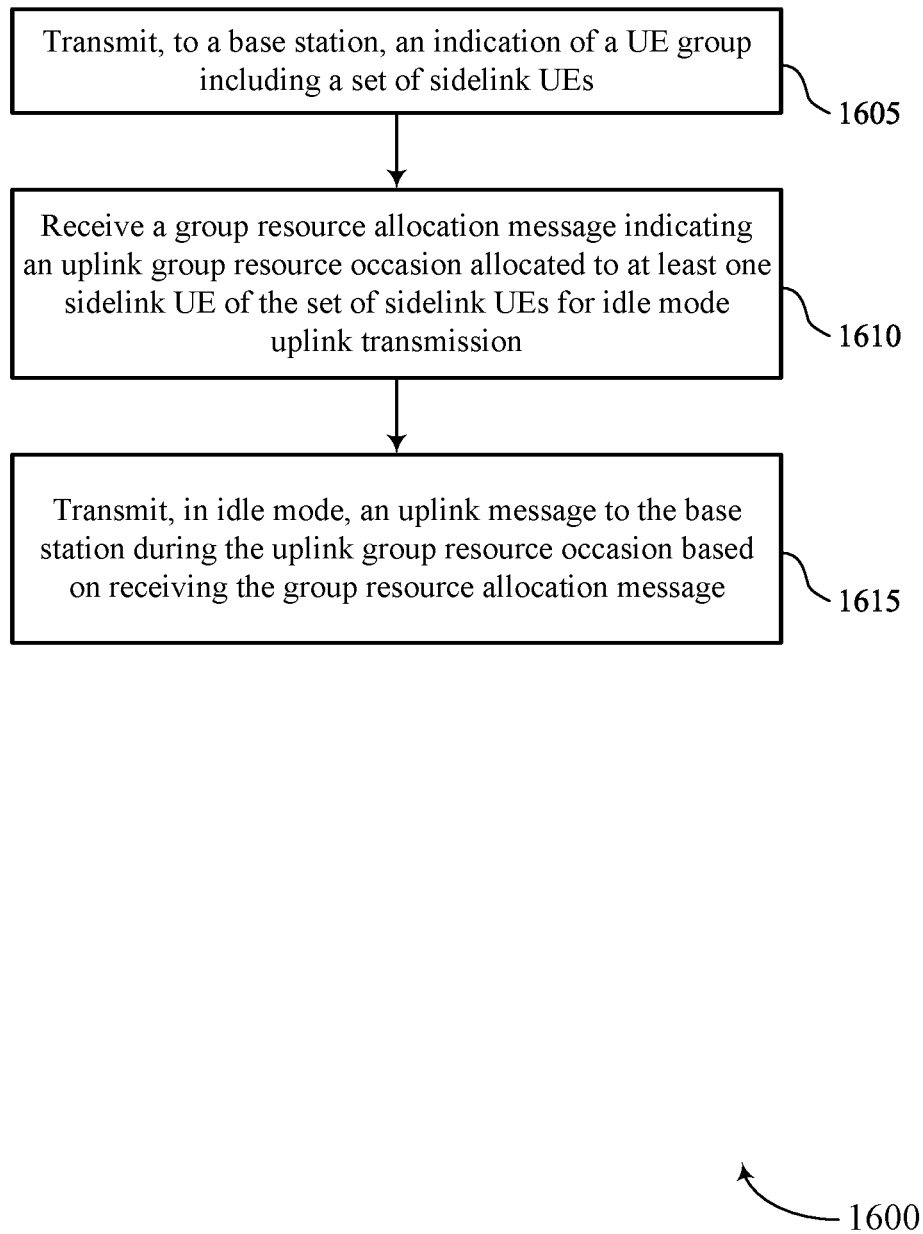
FIGS. 16 through 19 show flowcharts illustrating methods in accordance with aspects of the present disclosure.

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, an indication of a UE group including a set of multiple sidelink UEs. The operations of 1605 may be performed in accordance with examples as disclosed herein. In some examples, aspects of the operations of 1605 may be performed by a UE group indication component 1025 as described with reference to FIG. 10.

At 1610, the method may include receiving a group resource allocation message indicating an uplink group resource occasion allocated to at least one sidelink UE of the set of multiple sidelink UEs for idle mode uplink transmission. The operations of 1610 may be performed in accordance with examples as disclosed herein. In some examples, aspects of the operations of 1610 may be performed by a group resource allocation reception component 1030 as described with reference to FIG. 10.

At 1615, the method may include transmitting, in idle mode, an uplink message to the base station during the uplink group resource occasion based on receiving the group resource allocation message. The operations of 1615 may be performed in accordance with examples as disclosed herein. In some examples, aspects of the operations of 1615 may be performed by an uplink transmission component 1035 as described with reference to FIG. 10.

Figure 17:
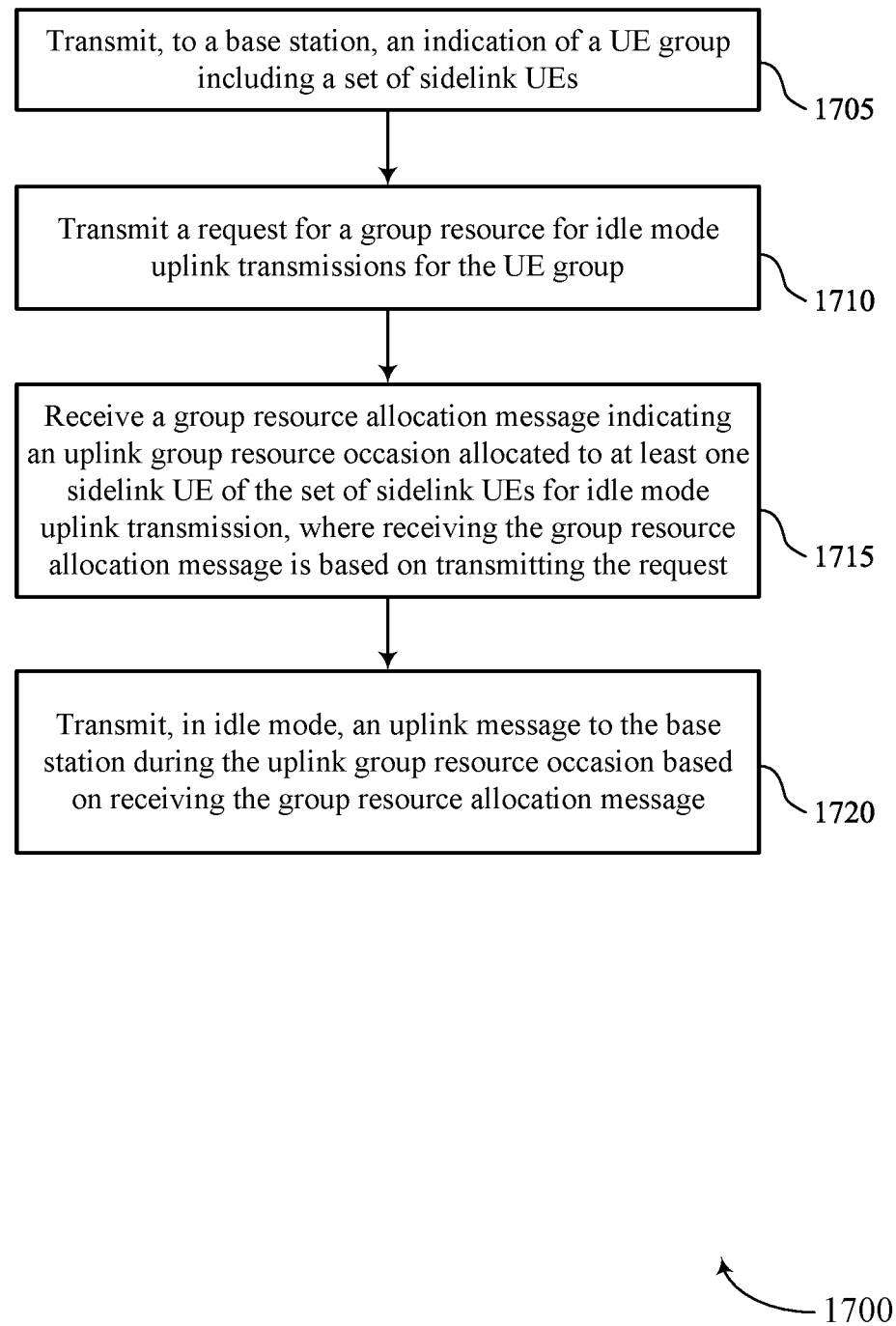

FIG. 17 shows a flowchart illustrating a method 1700 in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, an indication of a UE group including a set of multiple sidelink UEs. The operations of 1705 may be performed in accordance with examples as disclosed herein. In some examples, aspects of the operations of 1705 may be performed by a UE group indication component 1025 as described with reference to FIG. 10.

At 1710, the method may include transmitting a request for a group resource for idle mode uplink transmissions for the UE group. The operations of 1710 may be performed in accordance with examples as disclosed herein. In some examples, aspects of the operations of 1710 may be performed by a UE group indication component 1025 as described with reference to FIG. 10.

At 1715, the method may include receiving a group resource allocation message indicating an uplink group resource occasion allocated to at least one sidelink UE of the set of multiple sidelink UEs for idle mode uplink transmission, where receiving the group resource allocation message is based on transmitting the request. The operations of 1715 may be performed in accordance with examples as disclosed herein. In some examples, aspects of the operations of 1715 may be performed by a group resource allocation reception component 1030 as described with reference to FIG. 10.

At 1720, the method may include transmitting, in idle mode, an uplink message to the base station during the uplink group resource occasion based on receiving the group resource allocation message. The operations of 1720 may be performed in accordance with examples as disclosed herein. In some examples, aspects of the operations of 1720 may be performed by an uplink transmission component 1035 as described with reference to FIG. 10.

Figure 18:
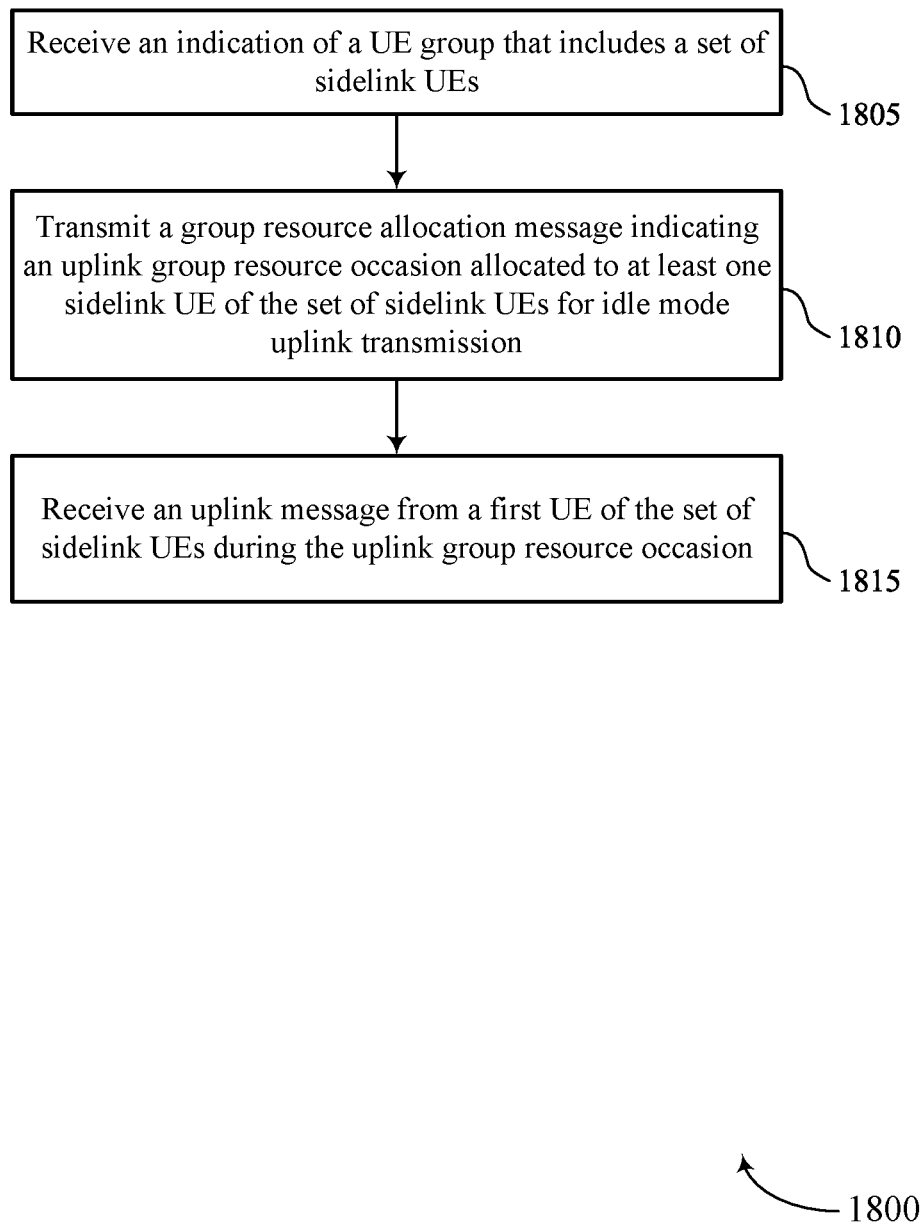

FIG. 18 shows a flowchart illustrating a method 1800 in accordance with aspects of the present disclosure. The operations of the method 1800 may be implemented by a base station or its components as described herein. For example, the operations of the method 1800 may be performed by a base station 105 as described with reference to FIGS. 1 through 6 and 12 through 15. In some examples, a base station may execute a set of instructions to control the functional elements of the base station to perform the described functions. Additionally or alternatively, the base station may perform aspects of the described functions using special-purpose hardware.

At 1805, the method may include receiving an indication of a UE group that includes a set of multiple sidelink UEs. The operations of 1805 may be performed in accordance with examples as disclosed herein. In some examples, aspects of the operations of 1805 may be performed by a UE group reception component 1425 as described with reference to FIG. 14.

At 1810, the method may include transmitting a group resource allocation message indicating an uplink group resource occasion allocated to at least one sidelink UE of the set of multiple sidelink UEs for idle mode uplink transmission. The operations of 1810 may be performed in accordance with examples as disclosed herein. In some examples, aspects of the operations of 1810 may be performed by a group resource allocation component 1430 as described with reference to FIG. 14.

At 1815, the method may include receiving an uplink message from a first UE of the set of multiple sidelink UEs during the uplink group resource occasion. The operations of 1815 may be performed in accordance with examples as disclosed herein. In some examples, aspects of the operations of 1815 may be performed by an uplink reception component 1435 as described with reference to FIG. 14.

Figure 19:
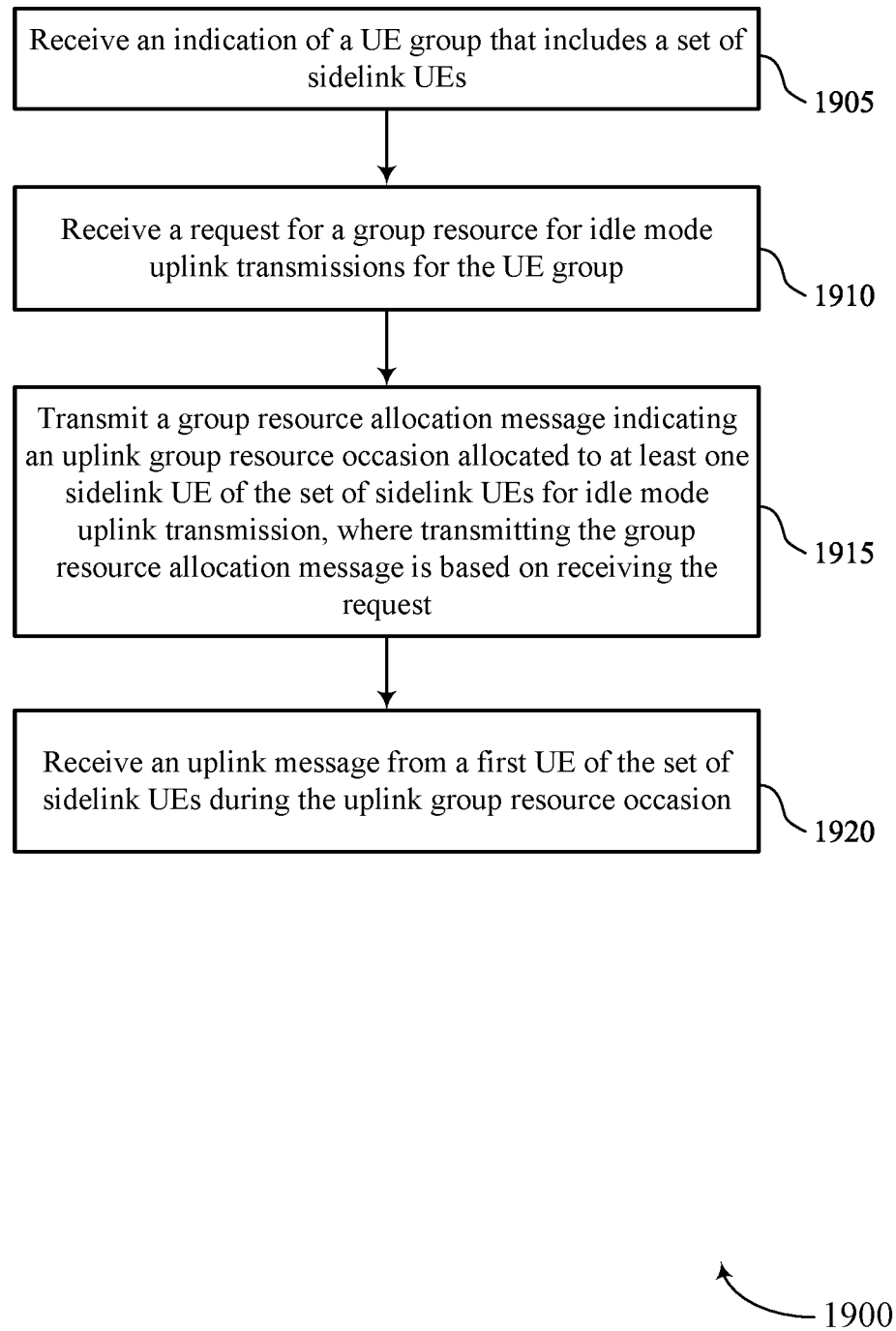

FIG. 19 shows a flowchart illustrating a method 1900 in accordance with aspects of the present disclosure. The operations of the method 1900 may be implemented by a base station or its components as described herein. For example, the operations of the method 1900 may be performed by a base station 105 as described with reference to FIGS. 1 through 6 and 12 through 15. In some examples, a base station may execute a set of instructions to control the functional elements of the base station to perform the described functions. Additionally or alternatively, the base station may perform aspects of the described functions using special-purpose hardware.

At 1905, the method may include receiving an indication of a UE group that includes a set of multiple sidelink UEs. The operations of 1905 may be performed in accordance with examples as disclosed herein. In some examples, aspects of the operations of 1905 may be performed by a UE group reception component 1425 as described with reference to FIG. 14.

At 1910, the method may include receiving a request for a group resource for idle mode uplink transmissions for the UE group. The operations of 1910 may be performed in accordance with examples as disclosed herein. In some examples, aspects of the operations of 1910 may be performed by a UE group reception component 1425 as described with reference to FIG. 14.

At 1915, the method may include transmitting a group resource allocation message indicating an uplink group resource occasion allocated to at least one sidelink UE of the set of multiple sidelink UEs for idle mode uplink transmission, where transmitting the group resource allocation message is based on receiving the request. The operations of 1915 may be performed in accordance with examples as disclosed herein. In some examples, aspects of the operations of 1915 may be performed by a group resource allocation component 1430 as described with reference to FIG. 14.

At 1920, the method may include receiving an uplink message from a first UE of the set of multiple sidelink UEs during the uplink group resource occasion. The operations of 1920 may be performed in accordance with examples as disclosed herein. In some examples, aspects of the operations of 1920 may be performed by an uplink reception component 1435 as described with reference to FIG. 14.

The following provides an overview of aspects of the present disclosure:

Aspect 1: A method for wireless communication at a first UE, comprising: transmitting, to a base station, an indication of a UE group comprising a plurality of sidelink UEs; receiving a group resource allocation message indicating an uplink group resource occasion allocated to at least one sidelink UE of the plurality of sidelink UEs for idle mode uplink transmission; and transmitting, in idle mode, an uplink message to the base station during the uplink group resource occasion based at least in part on receiving the group resource allocation message.

Aspect 2: The method of aspect 1, wherein transmitting the indication of the UE group comprises: transmitting a request for a group resource for idle mode uplink transmissions for the UE group, wherein receiving the group resource allocation message is based at least in part on transmitting the request.

Aspect 3: The method of any of aspects 1 through 2, wherein receiving the group resource allocation message comprises: receiving the group resource allocation message from the base station indicating the uplink group resource occasion is allocated to a first subset of the plurality of sidelink UEs, wherein the first subset includes the first UE.

Aspect 4: The method of aspect 3, further comprising: transmitting an indication of the uplink group resource occasion to one or more second UEs of a second subset of the plurality of sidelink UEs based at least in part on receiving the group resource allocation message.

Aspect 5: The method of any of aspects 1 through 4, wherein receiving the group resource allocation message comprises: receiving the group resource allocation message from the base station indicating the uplink group resource occasion is allocated to the plurality of sidelink UEs of the UE group.

Aspect 6: The method of any of aspects 1 through 5, wherein the group resource allocation message includes a group ID associated with the UE group.

Aspect 7: The method of any of aspects 1 through 6, wherein receiving the group resource allocation message comprises: receiving an RRC release message comprising the group resource allocation message.

Aspect 8: The method of any of aspects 1 through 6, wherein receiving the group resource allocation message comprises: receiving, operating in a connected mode, an RRC message comprising the group resource allocation message.

Aspect 9: The method of any of aspects 1 through 8, further comprising: receiving, from a second UE of the plurality of sidelink UEs, a sidelink message indicating uplink data to transmit to the base station via the uplink message during the uplink group resource occasion, wherein transmitting the uplink message to the base station is based at least in part on receiving the sidelink message.

Aspect 10: The method of any of aspects 1 through 9, wherein transmitting the uplink message comprises: transmitting the uplink message comprising uplink data at least partially overlapping with a transmission of the uplink data during the uplink group resource occasion by a second UE of the plurality of sidelink UEs.

Aspect 11: The method of any of aspects 1 through 10, wherein transmitting the uplink message comprises: transmitting the uplink message comprising uplink data and an ID of the first UE or a second UE, wherein the ID indicates that the uplink data is generated by the first UE or the second UE.

Aspect 12: The method of any of aspects 1 through 11, further comprising: receiving, from a second UE of the plurality of sidelink UEs, an allocation message allocating the uplink group resource occasion to the first UE, wherein transmitting the uplink message in the uplink group resource occasion is based at least in part on receiving the allocation message.

Aspect 13: The method of aspect 12, further comprising: transmitting, to the second UE, an allocation request message requesting the uplink group resource occasion for transmission of the uplink message, wherein receiving the allocation message from the second UE is based at least in part on transmitting the allocation request message.

Aspect 14: The method of any of aspects 1 through 11, further comprising: transmitting, to multiple UEs of the plurality of sidelink UEs, a sidelink control message reserving the uplink group resource occasion for transmission of the uplink message based at least in part on detecting that the uplink group resource occasion is unreserved, wherein transmitting the uplink message in the uplink group resource occasion is based at least in part on transmitting the sidelink control message.

Aspect 15: The method of aspect 14, wherein transmitting the uplink message comprises: transmitting the uplink message based at least in part on a number of continuous uplink transmissions by the first UE satisfying a threshold.

Aspect 16: The method of any of aspects 1 through 13 and 15, further comprising: receiving, from a controller UE of the plurality of sidelink UEs, an allocation message allocating the uplink group resource occasion and a second uplink group resource occasion to the first UE, wherein transmitting the uplink message in the uplink group resource occasion is based at least in part on receiving the allocation message; and transmitting a second uplink message to the base station during the second uplink group resource occasion based at least in part on receiving the allocation message.

Aspect 17: The method of any of aspects 1 through 11, 14, and 15, further comprising: transmitting, to multiple UEs of the plurality of sidelink UEs, a sidelink control message reserving the uplink group resource occasion and a second uplink group resource occasion, wherein transmitting the uplink message in the uplink group resource occasion is based at least in part on transmitting the sidelink control message; and transmitting a second uplink message to the base station during the second uplink group resource occasion based at least in part on transmitting the sidelink control message.

Aspect 18: The method of any of aspects 1 through 8 and 10 through 17, wherein transmitting the uplink message comprises: transmitting, during the uplink group resource occasion, the uplink message to one or more second UEs of the plurality of sidelink UEs for relaying the uplink message to the base station during a second uplink group resource occasion.

Aspect 19: The method of any of aspects 1 through 17, wherein transmitting the uplink message comprises: receiving, from a second UE of the plurality of sidelink UEs prior to the uplink group resource occasion, a sidelink message indicating uplink data to transmit to the base station during the uplink group resource occasion; and transmitting the uplink message comprising the uplink data at least partially overlapping with a transmission of the uplink data during the uplink group resource occasion by the second UE based at least in part on receiving the sidelink message.

Aspect 20: The method of any of aspects 1 through 19, wherein receiving the group resource allocation message comprises: receiving the group resource allocation message indicating an uplink group resource response occasion corresponding to the uplink group resource occasion.

Aspect 21: The method of aspect 20, further comprising: receiving, from the base station, a response to the uplink message in the uplink group resource response occasion corresponding to the uplink group resource occasion.

Aspect 22: The method of aspect 21, wherein receiving the response to the uplink message comprises: receiving the response to the uplink message in the uplink group resource response occasion at least partially overlapping with reception of the response to the uplink message during the uplink group resource response occasion at a second UE of the plurality of sidelink UEs.

Aspect 23: The method of any of aspects 21 through 22, wherein receiving the response to the uplink message comprises: receiving the response to the uplink message indicating a timing advance or an update to the uplink group resource occasion; and transmitting an indication of the timing advance or the update to the uplink group resource occasion to one or more second UEs of the plurality of sidelink UEs based at least in part on receiving the response to the uplink message.

Aspect 24: The method of aspect 20, further comprising: receiving, from a second UE of the plurality of sidelink UEs, a response to the uplink message relayed from the base station based at least in part on transmitting the uplink message.

Aspect 25: A method for wireless communication at a base station, comprising: receiving an indication of a UE group that includes a plurality of sidelink UEs; transmitting a group resource allocation message indicating an uplink group resource occasion allocated to at least one sidelink UE of the plurality of sidelink UEs for idle mode uplink transmission; and receiving an uplink message from a first UE of the plurality of sidelink UEs during the uplink group resource occasion.

Aspect 26: The method of aspect 25, wherein receiving the indication of the UE group comprises: receiving a request for a group resource for idle mode uplink transmissions for the UE group, wherein transmitting the group resource allocation message is based at least in part on receiving the request.

Aspect 27: The method of any of aspects 25 through 26, wherein transmitting the group resource allocation message comprises: transmitting the group resource allocation message indicating the uplink group resource occasion is allocated to a first subset of the plurality of sidelink UEs, wherein the first subset includes the first UE.

Aspect 28: The method of any of aspects 25 through 27, wherein transmitting the group resource allocation message comprises: transmitting the group resource allocation message indicating the uplink group resource occasion is allocated to the plurality of sidelink UEs of the UE group.

Aspect 29: The method of aspect 28, wherein the group resource allocation message includes a group ID associated with the UE group.

Aspect 30: The method of any of aspects 25 through 29, wherein transmitting the group resource allocation message comprises: transmitting an RRC release message comprising the group resource allocation message.

Aspect 31: The method of any of aspects 25 through 29, wherein transmitting the group resource allocation message comprises: transmitting an RRC message comprising the group resource allocation message to the at least one sidelink UE operating in a connected mode.

Aspect 32: The method of any of aspects 25 through 31, wherein receiving the uplink message comprises: receiving the uplink message from the first UE comprising uplink data; and receiving, from a second UE of the plurality of sidelink UEs, a second uplink message comprising the uplink data during the uplink group resource occasion.

Aspect 33: The method of any of aspects 25 through 32, wherein receiving the uplink message comprises: receiving the uplink message comprising uplink data and an ID of the first UE or a second UE, wherein the ID indicates that the uplink data is generated by the first UE or the second UE.

Aspect 34: The method of any of aspects 25 through 33, wherein transmitting the group resource allocation message comprises: transmitting the group resource allocation message indicating a threshold number of continuous uplink transmissions.

Aspect 35: The method of any of aspects 25 through 34, wherein receiving the uplink message comprises: receiving the uplink message from the first UE comprising uplink data; and receiving, during a second uplink group resource occasion after the uplink group resource occasion, a second uplink message comprising the uplink data from a second UE of the plurality of sidelink UEs.

Aspect 36: The method of any of aspects 25 through 35, wherein transmitting the group resource allocation message comprises: transmitting the group resource allocation message indicating an uplink group resource response occasion corresponding to the uplink group resource occasion.

Aspect 37: The method of aspect 36, further comprising: transmitting, to the first UE, a response to the uplink message during the uplink group resource response occasion corresponding to the uplink group resource occasion.

Aspect 38: The method of aspect 37, wherein transmitting the response to the uplink message comprises: transmitting, to a second UE of the plurality of sidelink UEs, the response to the uplink message during the uplink group resource response occasion.

Aspect 39: The method of any of aspects 36 through 38, further comprising: transmitting a response to the uplink message indicating a timing advance or an update to the uplink group resource occasion during the uplink group resource response occasion corresponding to the uplink group resource occasion.

Aspect 40: The method of any of aspects 36, 38, and 39, further comprising: transmitting, to a second UE of the plurality of sidelink UEs, a response to the uplink message during the uplink group resource response occasion corresponding to the uplink group resource occasion.

Aspect 41: An apparatus for wireless communication at a first UE, comprising a processor; memory coupled with the processor; and instructions stored in the memory and executable by the processor to cause the apparatus to perform a method of any of aspects 1 through 24.

Aspect 42: An apparatus for wireless communication at a first UE, comprising at least one means for performing a method of any of aspects 1 through 24.

Aspect 43: A non-transitory computer-readable medium storing code for wireless communication at a first UE, the code comprising instructions executable by a processor to perform a method of any of aspects 1 through 24.

Aspect 44: An apparatus for wireless communication at a base station, comprising a processor; memory coupled with the processor; and instructions stored in the memory and executable by the processor to cause the apparatus to perform a method of any of aspects 25 through 40.

Aspect 45: An apparatus for wireless communication at a base station, comprising at least one means for performing a method of any of aspects 25 through 40.

Aspect 46: A non-transitory computer-readable medium storing code for wireless communication at a base station, the code comprising instructions executable by a processor to perform a method of any of aspects 25 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    transmitting, to a network device, an indication of a UE group comprising a plurality of sidelink UEs;
    receiving a group resource allocation message indicating an uplink group resource occasion allocated to at least one sidelink UE of the plurality of sidelink UEs for idle mode uplink transmission; and
    transmitting, in idle mode, an uplink message to the network device during the uplink group resource occasion based at least in part on receiving the group resource allocation message.

2. The method of claim 1, wherein transmitting the indication of the UE group comprises:
    transmitting a request for a group resource for idle mode uplink transmissions for the UE group, wherein receiving the group resource allocation message is based at least in part on transmitting the request.

3. The method of claim 1, wherein receiving the group resource allocation message comprises:
    receiving the group resource allocation message from the network device indicating the uplink group resource occasion is allocated to a first subset of the plurality of sidelink UEs, wherein the first subset includes the first UE.

4. The method of claim 3, further comprising:
    transmitting an indication of the uplink group resource occasion to one or more second UEs of a second subset of the plurality of sidelink UEs based at least in part on receiving the group resource allocation message.

5. The method of claim 1, wherein receiving the group resource allocation message comprises:
    receiving the group resource allocation message from the network device indicating the uplink group resource occasion is allocated to the plurality of sidelink UEs of the UE group.

6. The method of claim 1, wherein the group resource allocation message includes a group identifier associated with the UE group.

7. The method of claim 1, wherein receiving the group resource allocation message comprises:
    receiving a radio resource control (RRC) release message comprising the group resource allocation message.

8. The method of claim 1, wherein receiving the group resource allocation message comprises:
    receiving, operating in a connected mode, a radio resource control (RRC) message comprising the group resource allocation message.

9. The method of claim 1, further comprising:
    receiving, from a second UE of the plurality of sidelink UEs, a sidelink message indicating uplink data to transmit to the network device via the uplink message during the uplink group resource occasion, wherein transmitting the uplink message to the network device is based at least in part on receiving the sidelink message.

10. The method of claim 1, wherein transmitting the uplink message comprises:
    transmitting the uplink message comprising uplink data at least partially overlapping with a transmission of the uplink data during the uplink group resource occasion by a second UE of the plurality of sidelink UEs.

11. The method of claim 1, wherein transmitting the uplink message comprises:
    transmitting the uplink message comprising uplink data and an identifier of the first UE or a second UE, wherein the identifier indicates that the uplink data is generated by the first UE or the second UE.

12. The method of claim 1, further comprising:
    receiving, from a second UE of the plurality of sidelink UEs, an allocation message allocating the uplink group resource occasion to the first UE, wherein transmitting the uplink message in the uplink group resource occasion is based at least in part on receiving the allocation message.

13. The method of claim 12, further comprising:
    transmitting, to the second UE, an allocation request message requesting the uplink group resource occasion for transmission of the uplink message, wherein receiving the allocation message from the second UE is based at least in part on transmitting the allocation request message.

14. The method of claim 1, further comprising:
    transmitting, to multiple UEs of the plurality of sidelink UEs, a sidelink control message reserving the uplink group resource occasion for transmission of the uplink message based at least in part on detecting that the uplink group resource occasion is unreserved, wherein transmitting the uplink message in the uplink group resource occasion is based at least in part on transmitting the sidelink control message.

15. The method of claim 14, wherein transmitting the uplink message comprises:
transmitting the uplink messaged at least in part on a quantity of continuous uplink transmissions by the first UE satisfying a threshold.

16. The method of claim 1, further comprising:
receiving, from a controller UE of the plurality of sidelink UEs, an allocation message allocating the uplink group resource occasion and a second uplink group resource occasion to the first UE, wherein transmitting the uplink message in the uplink group resource occasion is based at least in part on receiving the allocation message; and
transmitting a second uplink message to the network device during the second uplink group resource occasion based at least in part on receiving the allocation message.

17. The method of claim 1, further comprising:
transmitting, to multiple UEs of the plurality of sidelink UEs, a sidelink control message reserving the uplink group resource occasion and a second uplink group resource occasion, wherein transmitting the uplink message in the uplink group resource occasion is based at least in part on transmitting the sidelink control message; and
transmitting a second uplink message to the network device during the second uplink group resource occasion based at least in part on transmitting the sidelink control message.

18. The method of claim 1, wherein transmitting the uplink message comprises:
transmitting, during the uplink group resource occasion, the uplink message to one or more second UEs of the plurality of sidelink UEs for relaying the uplink message to the network device during a second uplink group resource occasion.

19. The method of claim 1, wherein transmitting the uplink message comprises:
receiving, from a second UE of the plurality of sidelink UEs prior to the uplink group resource occasion, a sidelink message indicating uplink data to transmit to the network device during the uplink group resource occasion; and
transmitting the uplink message comprising the uplink data at least partially overlapping with a transmission of the uplink data during the uplink group resource occasion by the second UE based at least in part on receiving the sidelink message.

20. The method of claim 1, wherein receiving the group resource allocation message comprises:
receiving the group resource allocation message indicating an uplink group resource response occasion corresponding to the uplink group resource occasion.

21. The method of claim 20, further comprising:
receiving, from the network device, a response to the uplink message in the uplink group resource response occasion corresponding to the uplink group resource occasion.

22. The method of claim 21, wherein receiving the response to the uplink message comprises:
receiving the response to the uplink message in the uplink group resource response occasion at least partially overlapping with reception of the response to the uplink message during the uplink group resource response occasion at a second UE of the plurality of sidelink UEs.

23. The method of claim 21, wherein receiving the response to the uplink message comprises:
receiving the response to the uplink message indicating a timing advance or an update to the uplink group resource occasion; and
transmitting an indication of the timing advance or the update to the uplink group resource occasion to one or more second UEs of the plurality of sidelink UEs based at least in part on receiving the response to the uplink message.

24. The method of claim 20, further comprising:
receiving, from a second UE of the plurality of sidelink UEs, a response to the uplink message relayed from the network device based at least in part on transmitting the uplink message.

25. A method for wireless communication at a network device, comprising:
receiving an indication of a user equipment (UE) group that includes a plurality of sidelink UEs;
transmitting a group resource allocation message indicating an uplink group resource occasion allocated to at least one sidelink UE of the plurality of sidelink UEs for idle mode uplink transmission; and
receiving an uplink message from a first UE of the plurality of sidelink UEs during the uplink group resource occasion.

26. The method of claim 25, wherein receiving the indication of the UE group comprises:
receiving a request for a group resource for idle mode uplink transmissions for the UE group, wherein transmitting the group resource allocation message is based at least in part on receiving the request.

27. The method of claim 25, wherein transmitting the group resource allocation message comprises:
transmitting the group resource allocation message indicating the uplink group resource occasion is allocated to a first subset of the plurality of sidelink UEs, wherein the first subset includes the first UE.

28. The method of claim 25, wherein transmitting the group resource allocation message comprises:
transmitting the group resource allocation message indicating the uplink group resource occasion is allocated to the plurality of sidelink UEs of the UE group.

29. The method of claim 28, wherein the group resource allocation message includes a group identifier associated with the UE group.

30. The method of claim 25, wherein transmitting the group resource allocation message comprises:
transmitting a radio resource control (RRC) release message comprising the group resource allocation message.

31. The method of claim 25, wherein transmitting the group resource allocation message comprises:
transmitting a radio resource control (RRC) message comprising the group resource allocation message to the at least one sidelink UE operating in a connected mode.

32. The method of claim 25, wherein receiving the uplink message comprises:
receiving the uplink message from the first UE comprising uplink data; and receiving, from a second UE of the plurality of sidelink UEs, a second uplink message comprising the uplink data during the uplink group resource occasion.

33. The method of claim 25, wherein receiving the uplink message comprises:
receiving the uplink message comprising uplink data and an identifier of the first UE or a second UE, wherein the identifier indicates that the uplink data is generated by the first UE or the second UE.

34. The method of claim 25, wherein transmitting the group resource allocation message comprises:
transmitting the group resource allocation message indicating a threshold quantity of continuous uplink transmissions.

35. The method of claim 25, wherein receiving the uplink message comprises:
receiving the uplink message from the first UE comprising uplink data; and
receiving, during a second uplink group resource occasion after the uplink group resource occasion, a second uplink message comprising the uplink data from a second UE of the plurality of sidelink UEs.

36. The method of claim 25, wherein transmitting the group resource allocation message comprises:
transmitting the group resource allocation message indicating an uplink group resource response occasion corresponding to the uplink group resource occasion.

37. The method of claim 36, further comprising:
transmitting, to the first UE, a response to the uplink message during the uplink group resource response occasion corresponding to the uplink group resource occasion.

38. The method of claim 37, wherein transmitting the response to the uplink message comprises:
transmitting, to a second UE of the plurality of sidelink UEs, the response to the uplink message during the uplink group resource response occasion.

39. The method of claim 36, further comprising:
transmitting a response to the uplink message indicating a timing advance or an update to the uplink group resource occasion during the uplink group resource response occasion corresponding to the uplink group resource occasion.

40. The method of claim 36, further comprising:
transmitting, to a second UE of the plurality of sidelink UEs, a response to the uplink message during the uplink group resource response occasion corresponding to the uplink group resource occasion.

41. An apparatus for wireless communication at a first user equipment (UE), comprising:
a processor;
memory coupled with the processor; and
instructions stored in the memory and executable by the processor to cause the apparatus to:
transmit, to a network device, an indication of a UE group comprising a plurality of sidelink UEs;
receive a group resource allocation message indicating an uplink group resource occasion allocated to at least one sidelink UE of the plurality of sidelink UEs for idle mode uplink transmission; and
transmit, in idle mode, an uplink message to the network device during the uplink group resource occasion based at least in part on receiving the group resource allocation message.

42. The apparatus of claim 41, further comprising a transceiver, wherein the instructions to transmit the indication of the UE group are executable by the processor to cause the apparatus to:
transmit, via the transceiver, a request for a group resource for idle mode uplink transmissions for the UE group, wherein receiving the group resource allocation message is based at least in part on transmitting the request.

43. The apparatus of claim 41, further comprising a transceiver, wherein the instructions to receive the group resource allocation message are executable by the processor to cause the apparatus to:
receive, via the transceiver, the group resource allocation message from the network device indicating the uplink group resource occasion is allocated to a first subset of the plurality of sidelink UEs, wherein the first subset includes the first UE.

44. The apparatus of claim 41, wherein the instructions are further executable by the processor to cause the apparatus to:
receive, from a second UE of the plurality of sidelink UEs, a sidelink message indicating uplink data to transmit to the network device via the uplink message during the uplink group resource occasion, wherein transmitting the uplink message to the network device is based at least in part on receiving the sidelink message.

45. The apparatus of claim 41, further comprising an antenna, wherein the instructions to transmit the uplink message are executable by the processor to cause the apparatus to:
transmit the uplink message comprising uplink data at least partially overlapping with a transmission of the uplink data during the uplink group resource occasion by a second UE of the plurality of sidelink UEs.

46. The apparatus of claim 41, wherein the instructions to transmit the uplink message are executable by the processor to cause the apparatus to:
transmit the uplink message comprising uplink data and an identifier of the first UE or a second UE, wherein the identifier indicates that the uplink data is generated by the first UE or the second UE.

47. The apparatus of claim 41, wherein the instructions are further executable by the processor to cause the apparatus to:
receive, from a second UE of the plurality of sidelink UEs, an allocation message allocating the uplink group resource occasion to the first UE, wherein transmitting the uplink message in the uplink group resource occasion is based at least in part on receiving the allocation message.

48. The apparatus of claim 41, wherein the instructions are further executable by the processor to cause the apparatus to:
transmit, to multiple UEs of the plurality of sidelink UEs, a sidelink control message reserving the uplink group resource occasion for transmission of the uplink message based at least in part on detecting that the uplink group resource occasion is unreserved, wherein transmitting the uplink message in the uplink group resource occasion is based at least in part on transmitting the sidelink control message.

49. The apparatus of claim 41, wherein the instructions to transmit the uplink message are executable by the processor to cause the apparatus to:

transmit, during the uplink group resource occasion, the uplink message to one or more second UEs of the plurality of sidelink UEs for relaying the uplink message to the network device during a second uplink group resource occasion.

50. The apparatus of claim 41, wherein the instructions to receive the group resource allocation message are executable by the processor to cause the apparatus to:
receive the group resource allocation message indicating an uplink group resource response occasion corresponding to the uplink group resource occasion.

51. The apparatus of claim 50, wherein the instructions are further executable by the processor to cause the apparatus to:
receive, from the network device, a response to the uplink message in the uplink group resource response occasion corresponding to the uplink group resource occasion.

52. The apparatus of claim 50, wherein the instructions are further executable by the processor to cause the apparatus to:
receive, from a second UE of the plurality of sidelink UEs, a response to the uplink message relayed from the network device based at least in part on transmitting the uplink message.

53. An apparatus for wireless communication at a network device, comprising:
a processor;
memory coupled with the processor; and
instructions stored in the memory and executable by the processor to cause the apparatus to:
receive an indication of a user equipment (UE) group that includes a plurality of sidelink UEs;
transmit a group resource allocation message indicating an uplink group resource occasion allocated to at least one sidelink UE of the plurality of sidelink UEs for idle mode uplink transmission; and
receive an uplink message from a first UE of the plurality of sidelink UEs during the uplink group resource occasion.

54. The apparatus of claim 53, further comprising a transceiver, wherein the instructions to receive the indication of the UE group are executable by the processor to cause the apparatus to:
receive, via the transceiver, a request for a group resource for idle mode uplink transmissions for the UE group, wherein transmitting the group resource allocation message is based at least in part on receiving the request.

55. The apparatus of claim 53, wherein the instructions to transmit the group resource allocation message are executable by the processor to cause the apparatus to:
transmit the group resource allocation message indicating the uplink group resource occasion is allocated to a first subset of the plurality of sidelink UEs, wherein the first subset includes the first UE.

56. The apparatus of claim 53, wherein the instructions to receive the uplink message are executable by the processor to cause the apparatus to:
receive the uplink message from the first UE comprising uplink data; and
receive, from a second UE of the plurality of sidelink UEs, a second uplink message comprising the uplink data during the uplink group resource occasion.

57. The apparatus of claim 53, wherein the instructions to receive the uplink message are executable by the processor to cause the apparatus to:
receive the uplink message comprising uplink data and an identifier of the first UE or a second UE, wherein the identifier indicates that the uplink data is generated by the first UE or the second UE.

58. The apparatus of claim 53, wherein the instructions to receive the uplink message are executable by the processor to cause the apparatus to:
receive the uplink message from the first UE comprising uplink data; and
receive, during a second uplink group resource occasion after the uplink group resource occasion, a second uplink message comprising the uplink data from a second UE of the plurality of sidelink UEs.

59. The apparatus of claim 53, wherein the instructions to transmit the group resource allocation message are executable by the processor to cause the apparatus to:
transmit the group resource allocation message indicating an uplink group resource response occasion corresponding to the uplink group resource occasion.

60. The apparatus of claim 59, wherein the instructions are further executable by the processor to cause the apparatus to:
transmit, to the first UE, a response to the uplink message during the uplink group resource response occasion corresponding to the uplink group resource occasion.

* * * * *